(12) United States Patent
Nakamura et al.

(10) Patent No.: US 6,996,250 B2
(45) Date of Patent: Feb. 7, 2006

(54) DIGITAL WATERMARK EMBEDDING PROCESSOR, DIGITAL WATERMARK DETECTING PROCESSOR, DIGITAL WATERMARK EMBEDDING-PROCESSING METHOD, DIGITAL WATERMARK DETECTING-PROCESSING METHOD, AND PROGRAM STORAGE MEDIUM AND PROGRAM USED THEREWITH

(75) Inventors: Osamu Nakamura, Saitama (JP); Yoichi Nishino, Kanagawa (JP); Takashi Kohashi, Tokyo (JP); Yuuki Matsumura, Tokyo (JP); Shunichi Soma, Chiba (JP)

(73) Assignee: Sony Corporation, Tokyo (JP)

( * ) Notice: Subject to any disclaimer, the term of this patent is extended or adjusted under 35 U.S.C. 154(b) by 669 days.

(21) Appl. No.: 10/123,560

(22) Filed: Apr. 15, 2002

(65) Prior Publication Data
US 2002/0181738 A1 Dec. 5, 2002

(30) Foreign Application Priority Data
Apr. 19, 2001 (JP) ............................ P2001-120495

(51) Int. Cl.
*G06K 9/00* (2006.01)
(52) U.S. Cl. ...................... 382/100; 382/173; 382/232
(58) Field of Classification Search ................ 380/210, 380/252, 287, 54, 51; 713/176; 370/522–529; 382/100, 173, 232
See application file for complete search history.

(56) References Cited

U.S. PATENT DOCUMENTS 6,304,966 B1 * 10/2001 Shimizu ...................... 713/100

OTHER PUBLICATIONS

Niu et al, "Multiresolution Digital Watermarking For Still Image", Neural Networks for Signal Processing X, 2000. Proceedings of the 2000 IEEE Signal Processing Society Workshop, vol.: 2, Dec. 11-13, 2000, pp.: 547-556 vol. 2□□.*

* cited by examiner

*Primary Examiner*—Brian Werner
*Assistant Examiner*—Christopher Lavin
(74) *Attorney, Agent, or Firm*—Jay H. Maioli

(57) ABSTRACT

A digital watermark embedding processor and digital watermark embedding-processing method set the lowest-common-multiple picture size of the sizes of an unconverted picture and a converted picture when embedding digital watermarks on certain data having a possibility of format conversion and set, for the lowest-common-multiple picture size, the values of the digital watermarks in the converted picture. Based on the set values, digital watermarks for the unconverted picture are set and are embedded in the picture. In this construction, even when a watermark-embedded picture is processed for conversion, it is ensured that accurate detection from the converted picture of watermarks can be performed.

18 Claims, 30 Drawing Sheets

FIG. 12
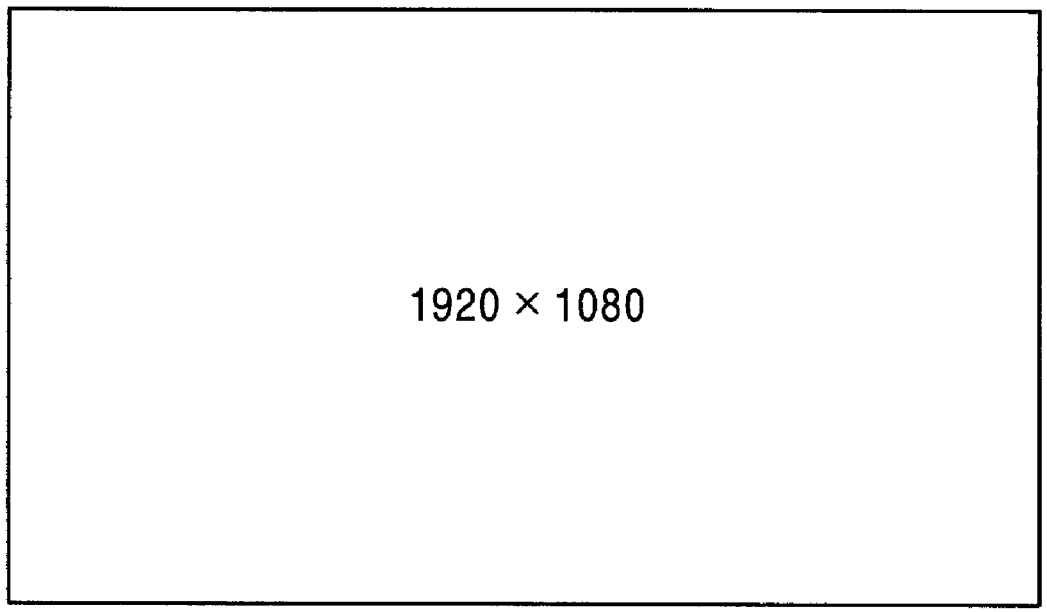
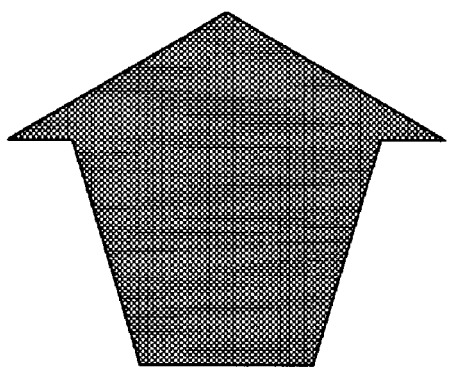
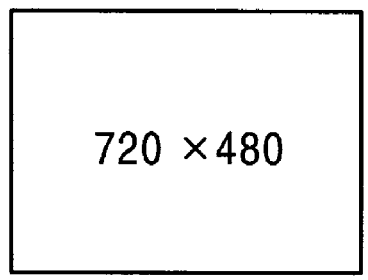

22 PIXELS

18 PIXELS $\frac{1}{3}$ PIXELS    $\frac{1}{3}$ PIXELS

22 PIXELS

18 PIXELS $\frac{2}{3}$ PIXELS

FIG. 18
21 PIXELS
18 PIXELS
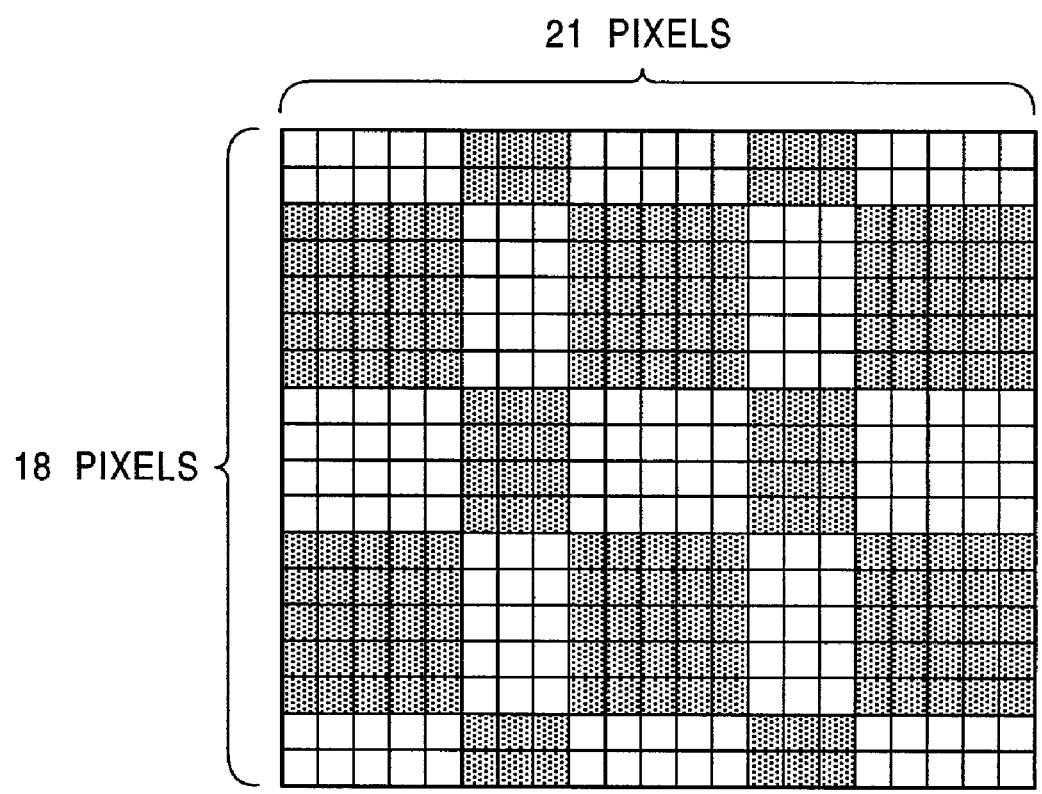
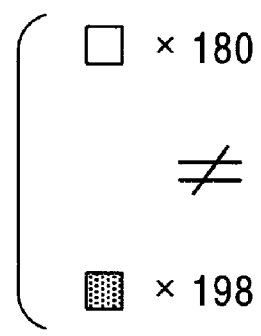

FIG. 21

22 PIXELS (rows) × 18 PIXELS (columns: 9 filled + 9 empty)

| 12 | 12 | -6 | -12 | -12 | -12 | -6 | 12 | 12 |  |  |  |  |  |  |  |  |  |
|---|---|---|---|---|---|---|---|---|---|---|---|---|---|---|---|---|---|
| 12 | 12 | -6 | -12 | -12 | -12 | -6 | 12 | 12 |  |  |  |  |  |  |  |  |  |
| 12 | 12 | -6 | -12 | -12 | -12 | -6 | 12 | 12 |  |  |  |  |  |  |  |  |  |
| 12 | 12 | -6 | -12 | -12 | -12 | -6 | 12 | 12 |  |  |  |  |  |  |  |  |  |
| 12 | 12 | -6 | -12 | -12 | -12 | -6 | 12 | 12 |  |  |  |  |  |  |  |  |  |
| -12 | -12 | 6 | 12 | 12 | 12 | 6 | -12 | -12 |  |  |  |  |  |  |  |  |  |
| -12 | -12 | 6 | 12 | 12 | 12 | 6 | -12 | -12 |  |  |  |  |  |  |  |  |  |
| -4 | -4 | 2 | 4 | 4 | 4 | 2 | -4 | -4 |  |  |  |  |  |  |  |  |  |
| 12 | 12 | -6 | -12 | -12 | -12 | -6 | 12 | 12 |  |  |  |  |  |  |  |  |  |
| 12 | 12 | -6 | -12 | -12 | -12 | -6 | 12 | 12 |  |  |  |  |  |  |  |  |  |
| 12 | 12 | -6 | -12 | -12 | -12 | -6 | 12 | 12 |  |  |  |  |  |  |  |  |  |
| 12 | 12 | -6 | -12 | -12 | -12 | -6 | 12 | 12 |  |  |  |  |  |  |  |  |  |
| -12 | -12 | 6 | 12 | 12 | 12 | 6 | -12 | -12 |  |  |  |  |  |  |  |  |  |
| -12 | -12 | 6 | 12 | 12 | 12 | 6 | -12 | -12 |  |  |  |  |  |  |  |  |  |
| -4 | -4 | 2 | 4 | 4 | 4 | 2 | -4 | -4 |  |  |  |  |  |  |  |  |  |
| 12 | 12 | -6 | -12 | -12 | -12 | -6 | 12 | 12 |  |  |  |  |  |  |  |  |  |
| 12 | 12 | -6 | -12 | -12 | -12 | -6 | 12 | 12 |  |  |  |  |  |  |  |  |  |
| 12 | 12 | -6 | -12 | -12 | -12 | -6 | 12 | 12 |  |  |  |  |  |  |  |  |  |
| 12 | 12 | -6 | -12 | -12 | -12 | -6 | 12 | 12 |  |  |  |  |  |  |  |  |  |
| 12 | 12 | -6 | -12 | -12 | -12 | -6 | 12 | 12 |  |  |  |  |  |  |  |  |  |
| 12 | 12 | -6 | -12 | -12 | -12 | -6 | 12 | 12 |  |  |  |  |  |  |  |  |  |
| 4 | 4 | -2 | -4 | -4 | -4 | -2 | 4 | 4 |  |  |  |  |  |  |  |  |  |

FIG. 23
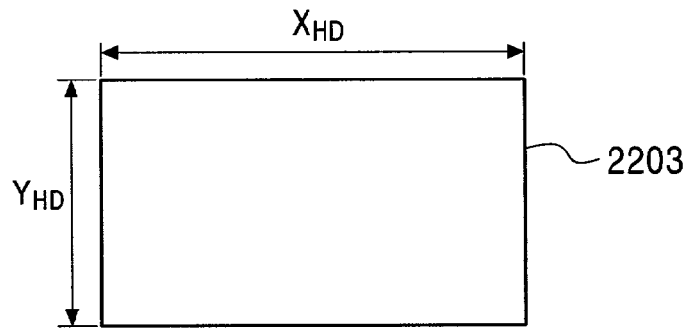
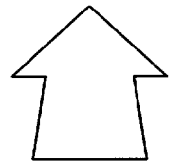
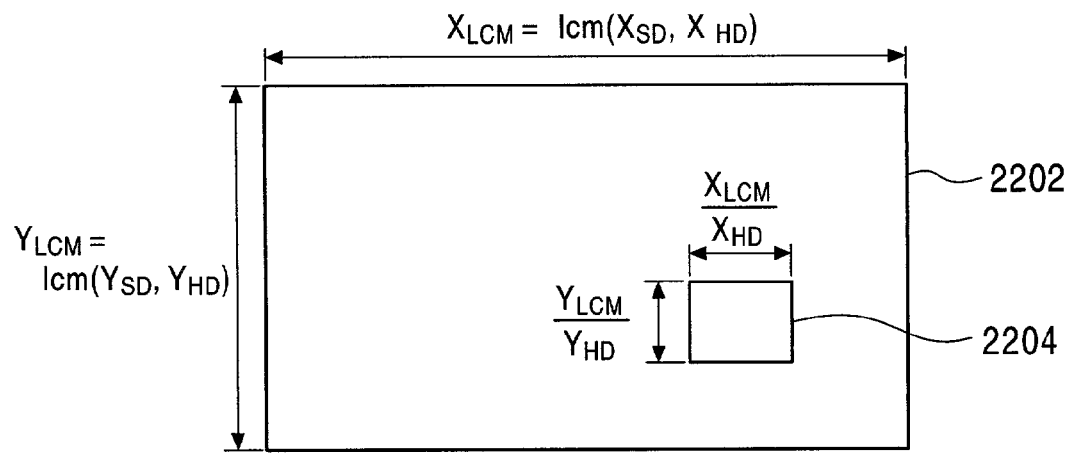
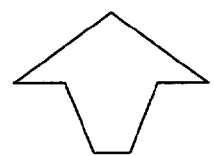
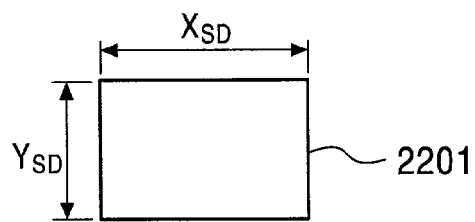

DIGITAL WATERMARK EMBEDDING PROCESSOR, DIGITAL WATERMARK DETECTING PROCESSOR, DIGITAL WATERMARK EMBEDDING-PROCESSING METHOD, DIGITAL WATERMARK DETECTING-PROCESSING METHOD, AND PROGRAM STORAGE MEDIUM AND PROGRAM USED THEREWITH

BACKGROUND OF THE INVENTION

1. Field of the Invention

The present invention relates to a technology for embedding or reading additional information, such as copyright information and editing information, in picture data or the like. The present invention relates to, for example, a digital watermark embedding processor, a digital watermark detecting processor, a digital watermark embedding-processing method, and a digital watermark detecting-processing method that are used to execute a process for embedding in a picture a digital watermark (also called "data hiding") as additional information that cannot be recognized in normal observation conditions, and a program storage medium and a program used therewith.

2. Description of the Related Art

With advance in digital technology, digital recording/playback devices that eliminate problems caused by repeatedly executing playback processing, such as picture quality deterioration and sound quality deterioration, have come into widespread use. In addition, various types of digital content such as various pictures and pieces of music have become able to be distributed by using media such as digital versatile disks and compact disks or by network.

In digital recording/playback technology, quality similar to that of the original data is maintained because data does not deteriorate even if the data is repeatedly recorded or played back, differently from analog recording and playback. Widespread use of this digital recording/playback technology results in a flood of unauthorized copies, so that it is a big problem from the point of view of copyright protection.

To cope with copyright infringement caused by unauthorized copies of digital content, a system for preventing unauthorized copying has been proposed. The system functions by adding copy control information for controlling copying of digital content, reading the copy control information in mode of recording or playback of content, and executing processing in accordance with the read copy control information.

There are various systems for controlling copying of content. For example, among them, a common one is the Copy Generation Management System (CGMS). When the CGMS is applied to analog video signals (which may be called "CGMS-A"), among 20 bits as additional information to be superimposed on an effective video part in one specified horizontal interval in the vertical blanking period of the brightness signal, for example, on an effective video part in the twentieth horizontal interval in the case of an NTSC (National Television System Committee) signal, two bits are superimposed as copy control information. When the CGMS is applied to digital video signals (which may be called "CGMS-D"), the signals are transmitted in a form in which they include 2-bit copy-control information as additional information to be added to digital video data.

In the CGMS, the 2-bit information (hereinafter referred to as the "CGMS information") has the following meanings: "00" indicates that content may be copied; "10" indicates that content may be copied once (copying is permitted in only one generation); and "11" indicates that content is prohibited from being copied (strict prohibition of copying).

The above CGMS is one type of common copy control system. In addition, there are other systems for protecting the copyright of content. For example, digital broadcasting by broadcasting stations employs a copy generation control system that, by storing a digital copy control descriptor in program arrangement information (i.e., service information) included in transport stream (TS) packets constituting digital data, performs copy generation control in accordance with the digital copy control descriptor when data received by a receiver is recorded in a recording unit.

Since the above descriptor is added as bit data to, for example, the header of content, it is impossible to completely exclude a possibility of interpolation of the added data. A system that is advantageous in excluding the possibility of data interpolation is digital watermarking. It is impossible to view or perceive a watermark in normal conditions for playing back content (picture data or audio data). Embedding and detection of the watermark can be performed only by executing a particular algorithm or by a particular device. When content is processed by a device such as a receiver or a recording/playback unit, by detecting the watermark, and controlling the processing in accordance with the watermark, reliable control is implemented.

Information that can be embedded by using a watermark includes, not only the above copy control information, but also various types of information such as content copyright information, content modification information, content structure information, content processing information, content editing information, and content-playback-system information. For example, by using watermarks to embed pieces of editing information in content editing mode, each editing step performs recognition of the type of step by referring to its watermark. This editing information is embedded as a new watermark in content in, for example, each step of editing content, and a process such as removal from the content of the watermark is finally performed.

Watermark Embedding

Various types of techniques for embedding and detecting digital watermarks in data have been proposed. Digital watermarking used in this embodiment is a technique based on data as original signals, for example, statistical properties of pictures. Accordingly, digital watermark embedding processing based on the statistical properties of pictures is described below.

When the original picture in which watermarks are to be embedded is represented by P, and a digital watermark pattern to be embedded in the original picture P is represented by W, the digital watermark pattern W satisfies the following expression:

$$\Sigma_{i,j} W_{i,j} = 0 \qquad (1)$$

By way of example, the original picture P and the digital watermark pattern W are defined by the following expressions:

$$P = \begin{pmatrix} 21 & 22 & 23 & 25 & 24 \\ 22 & 24 & 28 & 30 & 26 \\ 21 & 23 & 27 & 31 & 29 \\ 22 & 25 & 30 & 30 & 28 \end{pmatrix} \quad (2)$$

$$W = \begin{pmatrix} -1 & 1 & -1 & 1 & -1 \\ 1 & -1 & 1 & -1 & 1 \\ -1 & 1 & -1 & 1 & -1 \\ 1 & -1 & 1 & -1 & 1 \end{pmatrix}$$

In expression (1), for brevity of representation, the size of the original picture P is set to 5 by 4 pixels. Adjacent elements in the original picture P are respectively set as close values since adjacent pixels in a picture have, in general, close levels. Although the example shown in expression (2) shows that the original picture P and the digital watermark pattern W are set to have identical sizes, it is not required that the sizes of the original picture P and the digital watermark pattern W be not identical. If their sizes are not identical, arithmetic operations are performed for an area in which the original picture P and the digital watermark pattern W overlap with each other.

The digital watermark embedding processing is executed based on the following expression:

$$M = P + W \quad (3)$$

where M represents a picture generated by embedding the digital watermark pattern W in the original picture P. For the example shown in expression (2), the value of M is follows:

$$M = P + W \quad (4)$$
$$= \begin{pmatrix} 21 & 22 & 23 & 25 & 24 \\ 22 & 24 & 28 & 30 & 26 \\ 21 & 23 & 27 & 31 & 29 \\ 22 & 25 & 30 & 30 & 28 \end{pmatrix} + \begin{pmatrix} -1 & 1 & -1 & 1 & -1 \\ 1 & -1 & 1 & -1 & 1 \\ -1 & 1 & -1 & 1 & -1 \\ 1 & -1 & 1 & -1 & 1 \end{pmatrix}$$
$$= \begin{pmatrix} 20 & 23 & 22 & 26 & 23 \\ 23 & 23 & 29 & 29 & 27 \\ 20 & 24 & 26 & 32 & 28 \\ 23 & 24 & 31 & 29 & 29 \end{pmatrix}$$

Detection of Digital Watermarks

Detection of digital watermarks uses the digital watermark pattern W. Detection of watermarks for the original picture P in which the digital watermark pattern W is not embedded is defined by the following expression:

$$x = P \cdot W \quad (5)$$

watermark the operator "·" represents the inner product of the matrix, and x represents the inner product of the original picture P and the digital watermark pattern W.

Inner product x is a value in the proximity of zero because the sum of the elements of the digital watermark pattern W is zero (see expression (1)), and adjacent pixels in a picture tend in general to have close values. In the example shown in expression (2), the inner product is calculated by the following expression:

$$x = P \cdot W \quad (6)$$
$$= \begin{pmatrix} 21 & 22 & 23 & 25 & 24 \\ 22 & 24 & 28 & 30 & 26 \\ 21 & 23 & 27 & 31 & 29 \\ 22 & 25 & 30 & 30 & 28 \end{pmatrix} \cdot \begin{pmatrix} -1 & 1 & -1 & 1 & -1 \\ 1 & -1 & 1 & -1 & 1 \\ -1 & 1 & -1 & 1 & -1 \\ 1 & -1 & 1 & -1 & 1 \end{pmatrix}$$
$$= (-21 + 22 - 23 + 25 - 24) +$$
$$(+22 - 24 + 28 - 30 + 26) +$$
$$(-21 + 23 - 27 + 31 - 29) +$$
$$(+22 - 25 + 30 - 30 + 28)$$
$$= 3$$

Next, for a picture M having the embedded digital watermark pattern W, similar arithmetic operations are performed. Digital watermark detection for the picture M having the digital watermark pattern W is performed similarly to the above manner by calculating inner product x' in accordance with the following expression:

$$x' = M \cdot W \quad (7)$$
$$= (P + W) \cdot W$$
$$= P \cdot W + W \cdot W$$
$$= 3 + W \cdot W$$
$$= 3 + \begin{pmatrix} -1 & 1 & -1 & 1 & -1 \\ 1 & -1 & 1 & -1 & 1 \\ -1 & 1 & -1 & 1 & -1 \\ 1 & -1 & 1 & -1 & 1 \end{pmatrix} \cdot \begin{pmatrix} -1 & 1 & -1 & 1 & -1 \\ 1 & -1 & 1 & -1 & 1 \\ -1 & 1 & -1 & 1 & -1 \\ 1 & -1 & 1 & -1 & 1 \end{pmatrix}$$
$$= 3 +$$
$$(+1 + 1 + 1 + 1 + 1) +$$
$$(+1 + 1 + 1 + 1 + 1) +$$
$$(+1 + 1 + 1 + 1 + 1) +$$
$$(+1 + 1 + 1 + 1 + 1)$$
$$= 3 + 20$$

The inner product x' of the original picture P and the digital watermark pattern W is in the proximity of the inner product of the digital watermark pattern W itself, while the inner product of the original picture P and the digital watermark pattern W is a value in the proximity of zero. In other words, the inner product x' is a value in the proximity of the value of the following expression:

$$W \cdot W \quad (8)$$

The value of the above inner product W·W can be used as a measure of embedding intensity of digital watermarking. In embedding of a digital watermark pattern, when target inner product W·W is large, the embedding intensity of digital watermarking is described as "strong", while when target inner product W·W is small, the embedding intensity of digital watermarking is described as "weak".

In addition, when the absolute value of the inner product x of the original picture P and the digital watermark pattern W, and the absolute value of the inner product x' of the picture M in which digital watermarks are embedded and the digital watermark pattern W are large, the detection intensity of digital watermarking is expressed as "strong", while when the inner product x and the absolute value of the inner product x' are small, the detection intensity of digital watermarking is expressed as "weak".

Strong detection intensity of digital watermarking may be expressed as "great" or "high" correlation between a picture and a digital watermark pattern, while a state in which weak detection intensity of digital watermarking may be expressed as "small" or "low" correlation between a picture and a digital watermark pattern.

For various pictures, by finding the inner product x of the original picture P and the digital watermark pattern W, and the inner product x' of the picture M in which digital watermarks are embedded and the digital watermark pattern W, relative distributions of the frequency of the inner products are expressed by probability density functions f and f' as shown in FIG. 1.

Determination of whether or not digital watermarks are embedded needs to use distribution around zero of the values of the inner product x of the original picture P and the digital watermark pattern W, and distribution around the inner product W·W (of the digital watermark pattern W itself) of the values of the inner product x' of the watermark-embedded picture M and the digital watermark pattern W. By finding the inner product x" of a picture from which watermarks are to be detected and the digital watermark pattern W, and comparing the found inner product and a threshold value (th), determination of whether watermarks are embedded is performed. Specifically, for the purpose, the following expressions can be used:

$$x''<th \text{ then no-watermark}$$

$$x''\geq th \text{ then watermarked} \quad (9)$$

Expressions (9) indicate that, when the inner product x" of a picture from which watermarks are detected and the digital watermark pattern W is less than the threshold value (th), it is determined that the picture is not digitally watermarked, and when the inner product x" is not less than the threshold value (th), it is determined that the picture is digitally watermarked. These are expressed as shown in FIG. 2.

The threshold value (th) is determined based on the statistical properties of the probability density function f of inner product x and the probability density function f' of inner product x'. To determine that an inner product exceeds the threshold value (th) despite the fact that digital watermarks are not embedded, that is, to determine that digital watermarks are embedded despite the fact that the digital watermarks are not embedded is called "false positive". Conversely, to determine that an inner product does not reach the threshold value (th) despite the fact that the digital watermarks are embedded is called "false negative".

By setting probability $P_{PP}$ in which "false positive" occurs and probability $P_{FN}$ in which "false negative" occurs, the threshold value (th) is determined. If the central position W·W of the distribution of probability density function f' is not sufficiently large, it would be impossible to satisfy probabilities $P_{FP}$ and $P_{FN}$. Accordingly, the process for embedding the digital watermark pattern W in the original picture is changed from expression (3) to the following expression:

$$M=P+cW \quad (10)$$

where c represents a scalar value that is not negative.

In accordance with the change, the intensity of embedding the watermarks is changed from the inner product W·W of the digital watermark pattern W itself to an inner product multiplied by the scalar value, cW·W.

To determine the threshold value, first, the probabilities $P_{PP}$ and $P_{FN}$ required for an application using watermarks are set, and boundary values $th_{FP}$ and $th_{FN}$ used therefor are set. At this time, it is necessary to satisfy the following expression:

$$th_{FP} \leq th_{FN} \quad (11)$$

Next, the central position cW·W of probability density function f' is determined while considering the statistical properties of probability density functions f and f'so that the above expression $th_{FP} \leq th_{FN}$ is satisfied. Finally, the threshold value (th) is determined. A possible range of the threshold value (th) is as shown in FIG. 3.

When the digital watermark pattern W is embedded in the original picture P, in proportional to the number of changes made to the original picture P, that is, the magnitude of the central position cW·W, the amount of damage to the picture increases. Accordingly, it is a common way to determine scalar value c so that the central position cW·W satisfies desired probabilities $P_{FP}$ and $P_{FN}$ and cW·W is the least. In other words, the relationship represented by the following expression holds. This is specifically represented by the relationship shown in FIG. 4.

$$th_{FP}=th_{FN}=th \quad (12)$$

Depending on the application using digital watermarks, extremely small values may be found as the probabilities $P_{FP}$ and $P_{FN}$. In particular, it is strongly requested that the extremely small value be found. For example, in the case of applying digital watermarks to protection of copyright, if an unauthorized picture is mistakenly determined to be an authorized picture, the determination hardly leads to user complaints, while if an authorized picture is mistakenly determined to be an unauthorized picture, the determination has a large possibility of leading to user complaints. An example, obtained when probabilities $P_{FP}$ and $P_{FN}$ are set to be smaller than those of the example shown in FIG. 4, is shown in FIG. 5.

Values that are limitlessly close to zero are ideal for the probabilities $P_{FP}$ and $P_{FN}$. Nevertheless, if the threshold value (th) is so determined, the intensity cW·W of digital watermarks to be embedded increases, so that an influence to picture quality of the embedding of the digital watermarks cannot be ignored. The reliability of detection of the digital watermarks and the influence to the picture quality of the digital watermarks have a trade-off relationship.

Various techniques have been proposed which suppresses the influence to the picture quality of the digital watermarks while ensuring the reliability of detection of the digital watermarks. Among them, a widely employed basic technique is to strongly embed digital watermarks in the edge part of an original picture and to weakly embed digital watermarks in the flat part of the picture. This technique uses human visual features in which, when a pixel level is numerically changed, the change is easily noticeable in the flat part, but is hardly noticeable in the edge part. Even in a case in which the intensity of embedding the digital watermarks is set strong and weak in the edge part and the flat part, if a predetermined amount of digital watermark pattern has been embedded as a whole in the picture, the edge part and the flat part have almost identical reliabilities of detection of the digital watermarks.

Multibit Representation of Embedding Information

The process for embedding digital watermark pattern in a picture and the process for detecting the digital watermark pattern have been described. The process for detecting the digital watermark pattern can determine only two states, that is, whether the digital watermark pattern W is embedded or is not embedded. In other words, it can only represent 1-bit information. The following description refers to a method of using a plurality of bits to represent information to be embedded.

Embedding by digital watermarking of multibit information is broadly divided into a type of method that uses a plurality of digital watermark patterns, a type of method that divides a picture into smaller areas, and a composite thereof.

The type of method that uses a plurality of digital watermark patterns includes a method that represents desired information by assigning different meanings to a plurality of digital watermark patterns and exclusively embedding the patterns in a picture, a method that embeds a plurality of digital watermark patterns in a picture so that the patterns are simultaneously superimposed on one another, and uses a combination of the patterns to represent desired information, and a composite of the methods. Embedding of a plurality of digital watermark patterns in an original picture is shown in FIG. 6.

In the method that represents desired information by assigning different meanings to the digital watermark patterns and exclusively embedding the patterns in the picture, when the number of bits for information to be embedded in the picture is b, the required number of digital watermark patterns is $n=2^b$. In the method that embeds a plurality of digital watermark patterns in the picture so that the patterns are simultaneously superimposed on one another, and uses the combination of the patterns to represent the desired information, the required number of digital watermark patterns is n=b. Although the latter needs a small number of digital watermark patterns, in many cases, it may need appropriate measures for coping with deterioration in the picture quality due to the embedding of the digital watermark patterns in the picture. Finally, in the composite of both methods, the required number of digital watermark patterns is $b \leq n \leq 2^b$, and the composite has the features of both methods.

The method that divides a picture into smaller areas is one of a type of embedding by digital watermarking of multibit information. In this method, by assigning different roles to the smaller areas, the picture can be controlled to simultaneously have a plurality of digital watermarks. Various ways for arranging the smaller areas have been proposed. In this embodiment, the arrangement is described below using the example shown in FIG. 7 in which smaller areas are arranged in the form of a grid. In FIG. 7, i and j represent integers that are not negative, respectively.

In the case of dividing the picture into the smaller areas, the divisor is an issue. When information to be embedded in the picture has a size of b bits, division of the picture into b smaller areas is first considered. However, in this method, a problem easily occurs because, in the case of embedding digital watermark patterns in various pictures, embedding of the digital watermark patterns is, in many cases, performed considering visual characteristics of the pictures. For example, when a picture is processed so that digital watermark patterns are strongly embedded in the edge part of the picture and are weakly embedded in the flat part of the picture, if a smaller area corresponding to a certain bit is accidentally a portion of the flat part, a digital watermark pattern embedded in the portion may not be detected. Even in a case in which detection off the digital watermark pattern in one area has failed, if digital watermark patterns in the remaining areas are successfully detected, a combination of all the areas does not have any meaning. When a picture is divided into smaller areas, it is preferable to divide the picture into smaller areas more than b in that stable detection of digital watermark patterns can be performed for various pictures. Even in a case in which the intensity of embedding a digital watermark pattern in one smaller area is extremely weak, if the remaining smaller areas in which identical bit information is embedded sufficiently have the required amount of embedded digital watermark patterns, digital watermarks can be detected as a whole.

FIG. 8 shows an example of division into smaller areas in a case in which embedding information has eight bits. A plurality of smaller areas corresponding to the same bits are assigned in a picture.

Flow of Embedding Digital Watermark Patterns

FIG. 9 shows an example of a process performed in an apparatus that executes embedding of digital watermark patterns in a picture. A digital-watermark-pattern generating unit 1604 generates digital watermark patterns based on embedding information 1602 to be embedded in the picture and a digital-watermark-pattern generating key stored in a digital-watermark-pattern-generating-key storage unit 1603.

The embedding information is information to be embedded as digital watermarks, and includes copy control information, copyright information, and editing information. The digital-watermark-pattern generating key specifically includes picture-division information for use in embedding of digital watermark patterns, and bit-arrangement information, and is the process information required for generating the embedding information as the digital watermark patterns.

The digital-watermark-pattern embedding unit 1605 embeds, in an original picture 1601, the digital watermark patterns generated by the digital-watermark-pattern generating unit 1604. The intensity of embedding the digital watermark patterns in the edge part and flat part of the original picture 1601 is controlled by the digital-watermark-pattern embedding unit 1605. The picture in which the digital watermark patterns are embedded is output as a digital-watermark-embedded picture 1606.

Flow of Digital Watermark Detection

FIG. 10 shows an example of a process performed by an apparatus that executes detection of digital watermark patterns. A digital-watermark-pattern generating unit 1703 generates digital watermark patterns based on a digital-watermark-pattern-generating key stored in a digital-watermark-pattern-generating-key storage unit 1702.

The digital-watermark-pattern-generating key specifically includes picture-division information for use in embedding of the digital watermark patterns, and bit-arrangement information, and is the information required for detection of the digital watermark patterns.

A digital-watermark-pattern correction unit 1704 corrects the digital watermark patterns generated by the digital-watermark-pattern generating unit 1703 by using the picture format of an input picture 1701. The correction performed by the digital-watermark-pattern correction unit 1704 is a process that controls the generated digital watermark patterns to match the size of the input picture 1701 by recognizing the size of the input picture 1701 as a standard definition (SD) picture size having 720 by 480 pixels or as a high definition (HD) picture size having 1920 by 1080 pixels. This process is described next.

A detection unit 1706 detects the digital watermarks of the input picture 1702 by using the digital watermark patterns corrected by the digital-watermark-pattern correction unit

1704. Information detected by the detection unit 1706 is output as detected information 1707.

Picture Format Conversion

HD pictures are provided as picture information for use in television broadcasting by using various types of communication media or storage media. HD picture data represents a picture having a different aspect ratio (the ratio of the width of a picture to the height) from that of a standard (SD) picture of the related art and a different frequency range from that of the standard picture. For example, if a player has no function of processing a high quality picture (hereinafter referred to as an "HD picture"), it performs conversion (downconversion) of the HD picture into the standard picture (hereinafter referred to as the "SD picture"), and displays the SD picture obtained by the conversion. Conversely, it may perform conversion (upconversion) of the SD picture into the HD picture.

Conversion of a picture size, an aspect ratio, etc., is called "picture format conversion". In the following description, upconversion from the SD picture to the HD picture and downconversion from the HD picture to the SD picture are treated as types of format conversion. When digital watermark patterns are embedded in a picture, and the format of the picture is converted, detection of the embedded digital watermark patterns may be performed by, for example, using correction of the digital watermark patterns by the digital-watermark-pattern correction unit 1704 as described in FIG. 10. However, even if the correction has been performed, it may become difficult to perform detection or an error may occur.

By way of example, FIG. 11A shows that a digital watermark pattern is embedded in an SD picture and the SD picture is upconverted into an HD picture. Although the digital watermark pattern is easily detected from the original SD picture, it is difficult to say that the digital watermark pattern cannot be easily detected from the HD picture. One reason is that picture format conversion is not performed by using integers. For example, if the SD picture has a size of 720 by 480 pixels, and the HD picture has a size of 1920 by 1080 pixels where each picture size represents the product of the number of horizontal pixels and the number of vertical pixels, conversion of the SD picture into the HD picture is performed so that the horizontal direction is 8/3 times and the vertical direction is 9/4 times.

When this conversion using non-integers is performed, the digital watermark pattern embedded in the picture is similarly converted using non-integer magnifications. Since the detection of digital watermarks is executed by multiplying the watermark-embedded picture by the digital watermark pattern, if the embedded digital watermark pattern is slightly deformed, a digital watermark pattern for use in detection of digital watermarks must be similarly deformed. If the digital watermark pattern for detection is appropriately deformed, the detection of digital watermarks may fail.

Conversely, FIG. 11B shows that a digital watermark pattern is embedded in an HD picture, the HD picture is downconverted into an SD picture, and the digital watermark pattern is detected from the SD picture. Similarly to the case shown in FIG. 11A, the case in FIG. 11B shows non-integer conversion. Accordingly, if an appropriately deformed digital watermark pattern is not used for detection, detection of digital watermarks may fail.

How difficult the detection of digital watermarks becomes due to the picture format conversion is described below with reference to an example. Conversion that will be described is shown in FIG. 12. In this conversion, the original image is an SD pixel having a size of 720 by 480 pixels, and a picture generated by the conversion is an HD picture having a size of 1920 by 1080 pixels. However, this conversion is not limited to this combination.

When the SD picture is upconverted into the HD picture, each smaller area of 8 by 8 pixels in the SD picture is converted into each area in the HD picture, as shown in FIG. 13. The smaller area in the SD picture is shown in the lower part of FIG. 13, and when it is converted into the HD picture, that is, it is upconverted, each set of eight vertical pixels in the SD picture is converted into each set of 8 by (1080/480) pixels, and each set of eight horizontal pixels in the SD picture is converted into each set of 8 by (1920/720) pixels. Although no problem occurs if the pixel size is represented by a fraction, pixels represented by fractions, such as ⅓ pixel and ¼ pixel, actually do not exist. In FIG. 13, colors are represented by using the value "1" for white, and using the value "−1" for black. Each rectangular area shown in the upper part of FIG. 13 of the HD picture contains a plurality of pixels, and the substance is as shown in, for example, FIG. 14 or FIGS. 15A and 15B.

FIG. 14 shows an example of an actual form in the HD picture of the smaller area of 8 by 8 pixels in the SD picture. The smaller area of 8 by 8 pixels is converted into an area of the HD picture which has a size of (8 by (1920/720)) by (8 by (1080/480)) pixels, that is, (64/3) by 18 pixels. Actually, pixels represented by fractions, such as ⅓ pixel and ¼ pixel, do not exist. Thus, among pixels constituting the HD picture, pixels positioned in the boundary between black and white are set to be one of black and white. One technique is that, if the white percentage is 50% or greater, the pixels are set be white, and if the black percentage is 50% or greater, the pixels are set to be black. Alternatively, in another technique, the pixels are set to be black if even a small black percentage is set.

As a result, in the case of converting the SD picture into the HD picture, a problem occurs in that the pixel distribution of the SD picture does not accurately correspond to the pixel distribution of the HD picture. In the case of converting the SD picture into the HD picture, 8 vertical pixels correspond to 18 pixels, and each pixel of the SD picture corresponds to 18/8=9/4 pixel. Accordingly, integer pixels in the SD picture, such as one pixel or two pixels, cannot be set as integer pixels in the HD picture, so that fractions are generated. This generates pixels positioned in the boundaries between black and white, as shown in the upper part of FIG. 14. For example, if the white percentage is 50% or greater, the pixels are set to be white, and if the black percentage is 50%, the pixels are set to be black, so that errors are generated.

This similarly applies to horizontal pixels. Each pixel of the SD picture corresponds to (64/3)/8=8/3 pixel, and the integer pixels of the SD picture cannot be set as integer pixels of the HD picture, so that fractions are generated. This generates pixels positioned in the boundaries between black and white, as shown in the upper part of FIG. 14. For example, if the white percentage is 50% or greater, the pixels are set to be white, and if the black percentage is 50%, the pixels are set to be black, so that errors are generated.

FIG. 15 shows another example of the actual form in the HD picture of the smaller area of 8 by 8 pixels in the SD picture. The HD picture shown in the upper part of FIG. 14 is an example obtained by performing processing so that the left end of the HD picture corresponds to that of the SD picture and a ⅔-pixel spare area is generated at the right end of the HD picture. FIG. 15A shows an example of an HD picture obtained by setting the smaller area of 8 by 8 pixels in the center of the HD picture and generating two ⅓-pixel spare pixel areas at the two ends of the HD picture. FIG. 15B shows an example of an HD picture obtained by performing processing so that the right end of the HD picture corresponds to that of the SD picture and a ⅔-pixel spare area is generated at the left end of the HD picture. In both examples, integer pixels cannot be converted into integer pixels by conversion from the SD picture into the HD picture, so that a gap is generated in the percentage of the white area or the percentage of the black area.

As described above, in the process for embedding digital watermarks in the picture, the picture is divided into smaller areas, as shown in FIGS. 7 and 8, and a digital watermark pattern is embedded in each of the smaller areas. Assuming that each of the smaller areas is defined by 8 by 8 pixels of SD picture, smaller areas obtained by dividing the SD picture in units of 8 by 8 pixels, as shown in FIG. 7 or FIG. 8, should correspond to smaller areas obtained by dividing the HD picture in units of (64/3) by 18 pixels.

However, pixels represented by fractions are actually not allowed, as mentioned above. Thus, the smaller areas in the HD picture are set as shown in FIG. 16. In FIG. 16, each hatched portion indicates a portion in which adjacent smaller areas overlap with each other. The hatched portion corresponds to one right-end pixel among the 22 horizontal pixels shown in FIG. 14, one pixel at each end shown in FIG. 15A, or one left-end pixel shown in FIG. 15B.

Since the smaller areas of the HD picture can be set as shown in FIG. 16, it is possible that, when detection from the HD picture of digital watermarks is performed, the detection be performed while ignoring the hatched portions. Compared with the pixel levels of portions other than the hatched portions, the pixel levels of the hatched portions do not include digital watermark patterns. Thus, by using only the pixels of the portions other than the hatched portions, detection of digital watermarks is performed.

Also, it is possible that the HD picture obtained by upconverting the SD picture be processed so that each hatched portion (shown in FIG. 16) in the boundary between two smaller areas is included in either smaller area, as shown in FIG. 17, although it overlaps with the adjacent smaller area. FIG. 17 shows an HD picture obtained by performing processing so that each hatched portion is included in smaller areas that larger occupy the hatched portion. By performing this processing, each smaller area of 8 by 8 pixels in the SD picture can correspond to each smaller area of 21 by 18 pixels or 22 by 18 pixels in the HD picture.

Even in the case of detecting digital watermarks from the above converted pictures by executing the setting of smaller areas as shown in FIGS. 16 and 17, it is noted that the digital watermark pattern must satisfy expression (1).

By way of example, it is assumed that the digital watermark pattern shown in FIG. 14 is embedded in the smaller areas A shown in FIG. 17. Only two types of values, 1 and −1 are used, and an intermediate value is rounded to either value. The digital watermark pattern W in the HD picture is found as shown in FIG. 18. The digital watermark pattern W has a size of 21 by 18 pixels, and 180 ones (white pixels) and 198 negative ones (black pixels). As a result, in the converted HD picture, the left side of expression (1) is not zero, so that expression (1) is not satisfied.

When the digital watermark pattern W does not satisfy expression (1), the result of detection thereof has a high possibility of error. For example, assuming that a digital watermark pattern W which has 8 by 8 pixels and which is composed of positive and negative ones is embedded in a smaller area, 64 is expected as detected value x from the smaller area. The value 64 is obtained by the inner product W·W of digital watermark patterns W (see expressions (7) and (8)). However, if the digital watermark pattern W does not satisfy expression (1), and the sum of the digital watermark pattern W is not zero but one, the product of the one and each pixel level is included as an error.

In other words, in accordance with the above process executed in detection of digital watermarks, that is, expression (7), the inner product x' of the digital watermark pattern W and the picture M in which the digital watermark pattern W is embedded is calculated. The result of the calculation indicates that the values of P·W included in expression (7) are such relatively larger that they cannot be ignored compared with the inner product W·W. The pixel level is 0 to 255 when it is represented by eight bits. The error having a range of 0 to 255 is sufficient large to deny the meaning of 64 that should be obtained as a detected value of digital watermarks.

In the case of setting the division of the HD picture into smaller areas as shown in FIGS. 16 and 17, even if the digital watermark pattern W shown in FIG. 18 is found with high precision, expression (1) is not satisfied. This is because, at the time the smaller areas are represented as shown in FIGS. 16 and 17, errors due to the rounding of the values of the areas remain.

By adjusting values in the digital watermark pattern W shown in FIG. 18, the digital watermark pattern W can satisfy expression (1). However, accurate detection of digital watermarks is not expected because a digital watermark pattern that originally has errors due to the rounding of the values of smaller areas is adjusted afterward.

SUMMARY OF THE INVENTION

In view of the above problems in the related art, the present invention is made. It is an object of the present invention to provide a digital watermark embedding processor, a digital watermark detecting processor, a digital watermark embedding-processing method, and a digital watermark detecting-processing method in which, even when the correspondence between an original picture and a converted picture obtained by performing format conversion of the original picture is not established, that is, the pixels of the original picture do not accurately correspond to the pixels of the converted picture, digital watermarks can be accurately detected from the converted picture, and a program storage medium and a program that are used therewith.

To this end, according to a first aspect of the present invention, a digital watermark embedding processor for executing digital-watermark-pattern embedding processing on data is provided. The digital watermark embedding processor including a digital-watermark-pattern generating unit for generating a digital watermark pattern corresponding to a first picture format which is set beforehand, a digital-watermark-pattern correcting unit for executing a process of generating a corrected digital watermark pattern based on the generated digital watermark pattern, the corrected digital watermark pattern corresponding to a second picture format which is different from the first picture format, and a digital-watermark-pattern embedding unit for executing a process of embedding the corrected digital watermark pattern in the data.

Preferably, the digital-watermark-pattern correcting unit includes a lowest-common-multiple-picture digital-watermark-pattern generating unit which calculates the least-common-multiple picture size of the sizes of the first picture format and the second picture format, and generates for the calculated least-common-multiple picture size a lowestcommon-multiple-picture digital watermark pattern corresponding to the digital watermark pattern generated by the digital-watermark-pattern generating unit, and a second-picture-format digital-watermark-pattern generating unit which, based on the generated lowest-common-multiple-picture digital watermark pattern, executes a process of generating a digital watermark pattern corresponding to the second picture format.

The digital-watermark-pattern correcting unit may generate a corrected digital watermark pattern in which the sum of values set for the pixels of the digital watermark pattern is zero.

The data may be divided into smaller area in which each overlapping portion is provided between adjacent smaller areas, and the digital-watermark-pattern correcting unit may use the smaller areas as areas to be digitally watermarked by embedding of digital watermarks.

Each of the first picture format and the second picture format may be one of a high definition format and a standard definition format.

According to a second aspect of the present invention, a digital watermark embedding-processing method for executing digital-watermark-pattern embedding processing on data is provided. The digital watermark embedding-processing method includes a digital-watermark-pattern generating step for generating a digital watermark pattern corresponding to a first picture format which is set beforehand, a digital-watermark-pattern correcting step for executing a process of generating a corrected digital watermark pattern based on the generated digital watermark pattern, the corrected digital watermark pattern corresponding to a second picture format which is different from the first picture format, and a digital-watermark-pattern embedding step for executing a process of embedding the corrected digital watermark pattern in the data.

Preferably, the digital-watermark-pattern correcting step includes a lowest-common-multiple-picture digital-watermark-pattern generating step which calculates the least-common-multiple picture size of the sizes of the first picture format and the second picture format, and generates for the calculated least-common-multiple picture size a lowest-common-multiple-picture digital watermark pattern corresponding to the digital watermark pattern generated in the digital-watermark-pattern generating step, and a second-picture-format digital-watermark-pattern generating step which, based on the generated lowest-common-multiple-picture digital watermark pattern, executes a-process of generating a digital watermark pattern corresponding to the second picture format.

The digital-watermark-pattern correcting step may include the steps of generating a corrected digital watermark pattern in which the sum of values set for the pixels of the digital watermark pattern is zero.

The data may be divided into smaller area in which each overlapping portion is provided between adjacent smaller areas, and in the digital-watermark-pattern correcting step, the smaller areas may be used as areas to be digitally watermarked by embedding of digital watermarks.

Each of the first picture format and the second picture format may be one of a high definition format and a standard definition format.

According to a third aspect of the present invention, a digital watermark detecting processor for executing digital-watermark-pattern detecting processing on data is provided. The digital watermark pattern apparatus includes a digital-watermark-pattern generating unit for generating a digital watermark pattern corresponding to a first picture format which is set beforehand, a digital-watermark-pattern correcting unit for executing a process of generating a corrected digital watermark pattern based on the generated digital watermark pattern, the corrected digital watermark pattern corresponding to a second picture format which is different from the first picture format, and a detection unit for executing a digital-watermark-pattern detecting processing based on the corrected digital watermark pattern.

Preferably, the digital-watermark-pattern correcting unit comprises a lowest-common-multiple-picture digital-watermark-pattern generating unit which calculates the least-common-multiple picture size of the sizes of the first picture format and the second picture format, and generates for the calculated least-common-multiple picture size a lowest-common-multiple-picture digital watermark pattern corresponding to the digital watermark pattern generated by the digital-watermark-pattern generating unit, and a second-picture-format digital-watermark-pattern generating unit which, based on the generated lowest-common-multiple-picture digital watermark pattern, executes a process of generating a digital watermark pattern corresponding to the second picture format.

The digital-watermark-pattern correcting unit may generate a corrected digital watermark pattern in which the sum of values set for the pixels of the digital watermark pattern is zero.

The data may be divided into smaller area in which each overlapping portion is provided between adjacent smaller areas, and the digital-watermark-pattern correcting unit may use the smaller areas as areas to be digitally watermarked by embedding of digital watermarks.

Each of the first picture format and the second picture format may be one of a high definition format and a standard definition format.

According to a fourth aspect of the present invention, a digital watermark detecting-processing method for executing digital-watermark-pattern detecting processing on data is provided. The digital watermark detecting-processing method includes a digital-watermark-pattern generating step for generating a digital watermark pattern corresponding to a first picture format which is set beforehand, a digital-watermark-pattern correcting step for executing a process of generating a corrected digital watermark pattern based on the generated digital watermark pattern, the corrected digital watermark pattern corresponding to a second picture format which is different from the first picture format, and a detection step for executing a digital watermark detecting process based on the corrected digital watermark pattern.

Preferably, the digital-watermark-pattern correcting step includes a lowest-common-multiple-picture digital-watermark-pattern generating step which calculates the least-common-multiple picture size of the sizes of the first picture format and the second picture format, and generates for the calculated least-common-multiple picture size a lowest-common-multiple-picture digital watermark pattern corresponding to the digital watermark pattern generated in the digital-watermark-pattern generating step, and a second-picture-format digital-watermark-pattern generating step which, based on the generated lowest-common-multiple-picture digital watermark pattern, executes a process of generating a digital watermark pattern corresponding to the second picture format.

The digital-watermark-pattern correcting step may include the steps of generating a corrected digital watermark pattern in which the sum of values set for the pixels of the digital watermark pattern is zero.

The data may be divided into smaller area in which each overlapping portion is provided between adjacent smaller areas, and in the digital-watermark-pattern correcting step, the smaller areas may be used as areas to be digitally watermarked by embedding of digital watermarks.

Each of the first picture format and the second picture format may be one of a high definition format and a standard definition format.

According to a fifth aspect of the present invention, a program storage medium for providing a computer program controlling a computer system to execute digital-watermark-pattern embedding processing on data is provided. The computer program includes a digital-watermark-pattern generating step for generating a digital watermark pattern corresponding to a first picture format which is set beforehand, a digital-watermark-pattern correcting step for executing a process of generating a corrected digital watermark pattern based on the generated digital watermark pattern, the corrected digital watermark pattern corresponding to a second picture format which is different from the first picture format, and a digital-watermark-pattern embedding step for executing a process of embedding the corrected digital watermark pattern in the data.

According to a sixth aspect of the present invention, a program storage medium for providing a computer program controlling a computer system to execute digital-watermark-pattern detecting processing on data is provided. The computer program includes a digital-watermark-pattern generating step for generating a digital watermark pattern corresponding to a first picture format which is set beforehand, a digital-watermark-pattern correcting step for executing a process of generating a corrected digital watermark pattern based on the generated digital watermark pattern, the corrected digital watermark pattern corresponding to a second picture format which is different from the first picture format, and a detection step for executing a digital watermark detecting process based on the corrected digital watermark pattern.

According to a seventh aspect of the present invention, a program for controlling a computer system to execute digital-watermark-pattern embedding processing on data is provided. The program includes a digital-watermark-pattern generating unit for generating a digital watermark pattern corresponding to a first picture format which is set beforehand, a digital-watermark-pattern correcting unit for executing a process of generating a corrected digital watermark pattern based on the generated digital watermark pattern, the corrected digital watermark pattern corresponding to a second picture format which is different from the first picture format, and a detection unit for executing a digital-watermark-pattern detecting processing based on the corrected digital watermark pattern.

According to an eighth aspect of the present invention, a program for controlling a computer system to execute digital-watermark-pattern detecting processing on data is provided. The program includes a digital-watermark-pattern generating step for generating a digital watermark pattern corresponding to a first picture format which is set beforehand, a digital-watermark-pattern correcting step for executing a process of generating a corrected digital watermark pattern based on the generated digital watermark pattern, the corrected digital watermark pattern corresponding to a second picture format which is different from the first picture format, and a detection step for executing a digital watermark detecting process based on the corrected digital watermark pattern.

A program of the present invention can be provided in the form of being stored in a medium for providing the program in computer-readable form to a multipurpose computer system capable of executing various program codes, for example, in a storage medium such as a CD, a floppy disk, or an MO disk. A program storage medium of the present invention is a medium for providing a computer program in computer-readable form to a multipurpose computer system capable of executing various program codes. The type of the program storage medium is not particularly limited, but may be a recording medium such as a CD, a floppy disk, an MO disk, or a transmission medium such as a network.

When being read under processor control, this program defines the execution of the functions of the system and exhibits cooperative operation of the system, whereby operation and effect similar to those in other aspects of the present invention can be obtained.

According to the present invention, the following various advantages are obtained. Since, even in a picture-format-converted picture, approximation of a digital watermark pattern obtained before the picture format of a digital-watermark-embedded picture is converted can be performed with precision, it is ensured that embedded watermarks can be detected even if the picture format of a picture in which the embedded watermarks are embedded is converted.

According to the present invention, when digital watermarks are embedded, by setting the lowest-common-multiple picture size of the sizes of a format-unconverted picture and a format-converted picture, setting for the lowest-common-multiple picture the values of digital watermarks in the converted picture, setting digital watermarks in the unconverted picture based on the set values, and embedding the digital watermarks in the picture, if the format of a picture in which digital watermarks are embedded is converted, the digital watermarks can be securely detected.

According to the present invention, since if the format of a picture in which digital watermarks are embedded is converted, the digital watermarks can be securely detected. Thus, by embedding in a picture a digital watermark pattern based on the most standard picture format, the digital watermark pattern can be securely detected, even if the format of the picture is converted into another picture format. Accordingly, although there are various types of picture formats, embedding of a digital watermark pattern can be performed on condition that the most standard picture format is used.

According to the present invention, for example, in a case in which it is necessary to detect digital watermark pattern in an SD picture, if an HD-picture digital watermark pattern is embedded in an HD picture in accordance with the above method, a digital watermark pattern on an SD picture obtained by downconverting the watermark-embedded HD picture is similar to that obtained in the case of embedding an SD-picture digital watermark pattern in an SD picture. As described above, it is possible to use a digital watermark pattern that can be accurately and efficiently detected on an SD picture and that can be used for an HD picture. This can be used, not only between the HD picture and the SD picture, but also between various pictures having different picture formats.

In addition, according to the present invention, by setting smaller areas to be digitally watermarked which are formed by dividing a picture so that they overlap with one another, even in a picture of which picture format is converted, a digital watermark pattern which is similar to the digital watermark pattern of a digital-watermark-pattern-embedded picture before its picture format is converted can be embedded or detected with good precision in each smaller area having a predetermined size.

Further objects, features and advantages of the present invention will become apparent from the following description of the preferred embodiments with reference to the accompanying drawings.

BRIEF DESCRIPTION OF THE DRAWINGS

FIG. 12 is an illustration of a conversion process between an HD picture and an SD picture;

FIG. 18 is an illustration of a problem in smaller area setting in a conversion process between an HD picture and an SD picture;

FIG. 21 is an illustration of values set for digital watermarks in the case of conversion from an SD picture into an HD picture;

FIG. 23 is an illustration of a conversion process using the lowest-common-multiple picture of an SD picture and an HD picture;

DESCRIPTION OF THE PREFERRED EMBODIMENTS

A picture format converting process according to the present invention that is applied to embedding and detection of digital watermarks is described below. In the following description, conversion of, for example, an HD picture for use in television broadcasting, and an SD picture of the related art are described as examples of format conversion. However, the present invention is not limited to only conversion between the HD picture and the SD picture, but can be applied to conversion of pictures having different aspect ratios and picture sizes.

Picture Format Conversion

HD pixel data represents a picture having an aspect ratio and picture size (resolution) different from an SD picture of the related art. When a player that plays back the HD pixel data has no high-quality-picture processing function, it executes a process of converting (downconverting) the HD pixel data into an SD picture as a standard picture, and displays the SD picture. Conversely, it executes a process of converting (upconverting) the SD picture into an HD picture. Conversion of the aspect ratio and size (resolution) of the picture is called "picture format conversion".

Figure 19B:
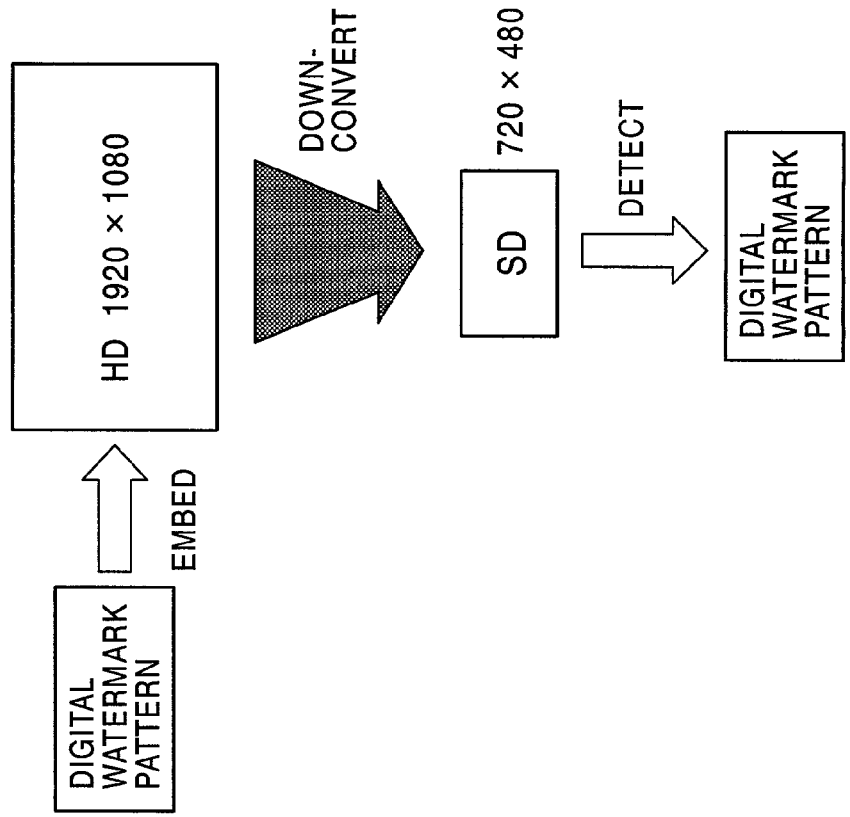
FIGS. 19A and 19B are illustrations of conversion processes between an HD signal and an SD picture.
Figure 19A:
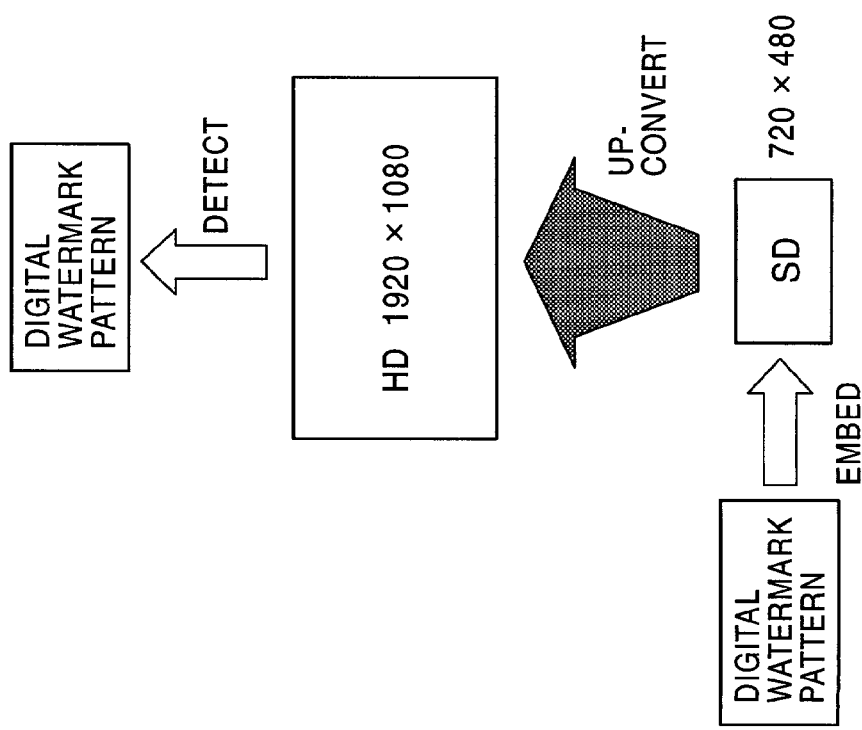

FIGS. 19A and 19B show format converting processes for pictures in which digital watermarks are embedded. FIG. 19A shows that digital watermark patterns are embedded in an SD picture having a size of 720 by 480 pixels, the watermark-embedded picture is upconverted into an HD picture having a size of 1920 by 1080 pixels, and the digital watermark patterns are detected. FIG. 19B shows an inverse process of the process shown in FIG. 19A and shows that digital watermark patterns are embedded in an HD picture having a size of 1920 by 1080 pixels, the watermark-embedded picture is downconverted into an SD picture having a size of 720 by 480 pixels, and the digital watermark patterns are detected.

Conventionally, after either picture format conversion is performed, as described above, in each smaller area obtained by converting each smaller area (e.g., 8 by 8 pixels in the SD picture) in which the digital watermarks are embedded, the number of pixels is not an integer. Thus, expression (1) is not satisfied, so that an error occurs in detection of the digital watermarks.

The present invention is intended to provide a construction preventing such an error from occurring. An example of setting smaller areas of an HD picture in the case in the present invention of embedding digital watermarks in an SD picture and converting the SD picture into an HD picture is described below with reference to FIG. 20.

Setting of Smaller Areas and Digital Watermark Pattern

Figure 1:
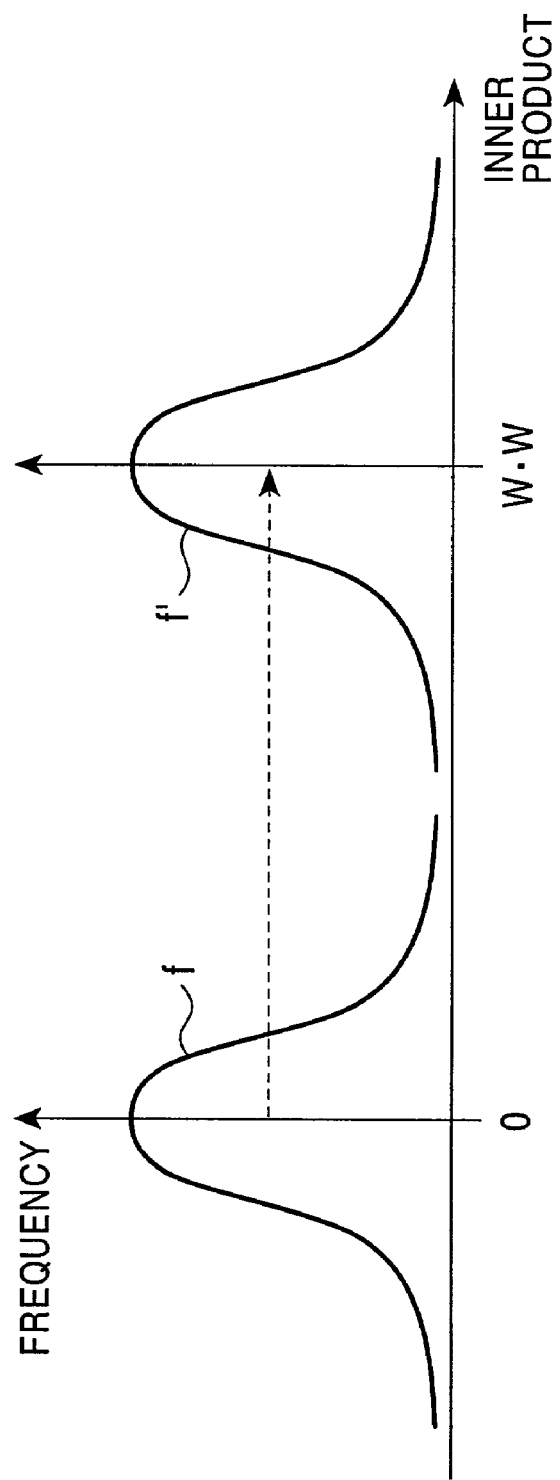
FIG. 1 is a graph showing in the form of relative distributions the frequency of the inner product of an original picture and a digital watermark pattern and the inner product of a picture in which a digital watermark pattern is embedded and the digital watermark pattern.
Figure 2:
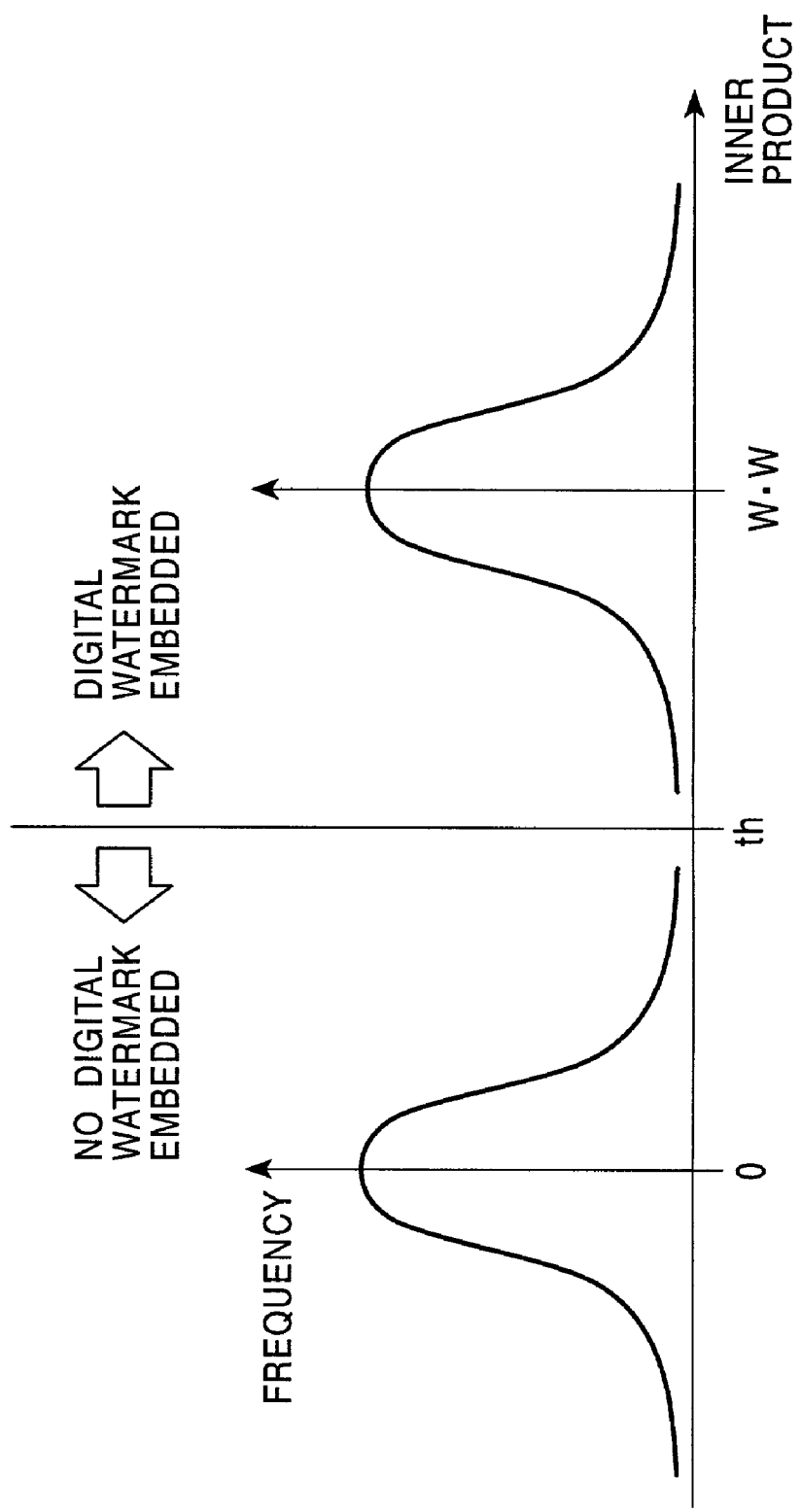
FIG. 2 is a graph showing a standard of determining whether or not digital watermarks are included in a picture.
Figure 3:
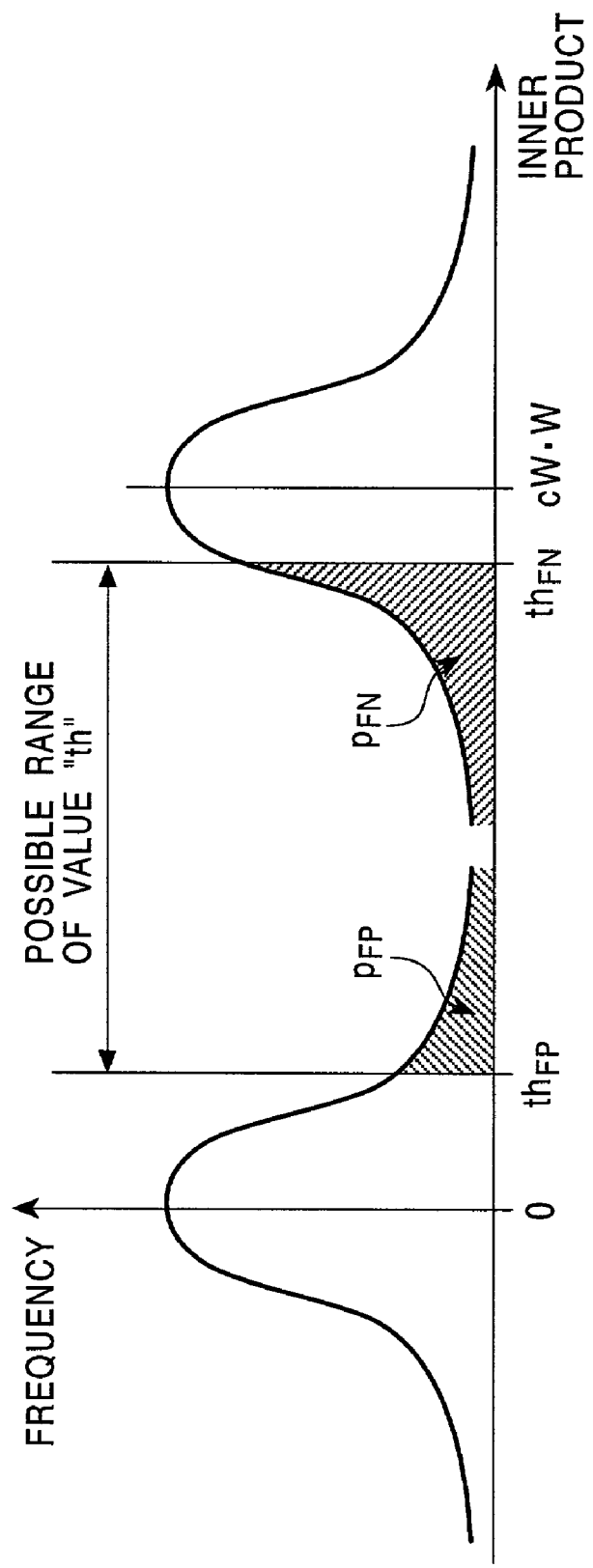
FIG. 3 is a graph showing a threshold value (th) used for detection of digital watermarks.
Figure 4:
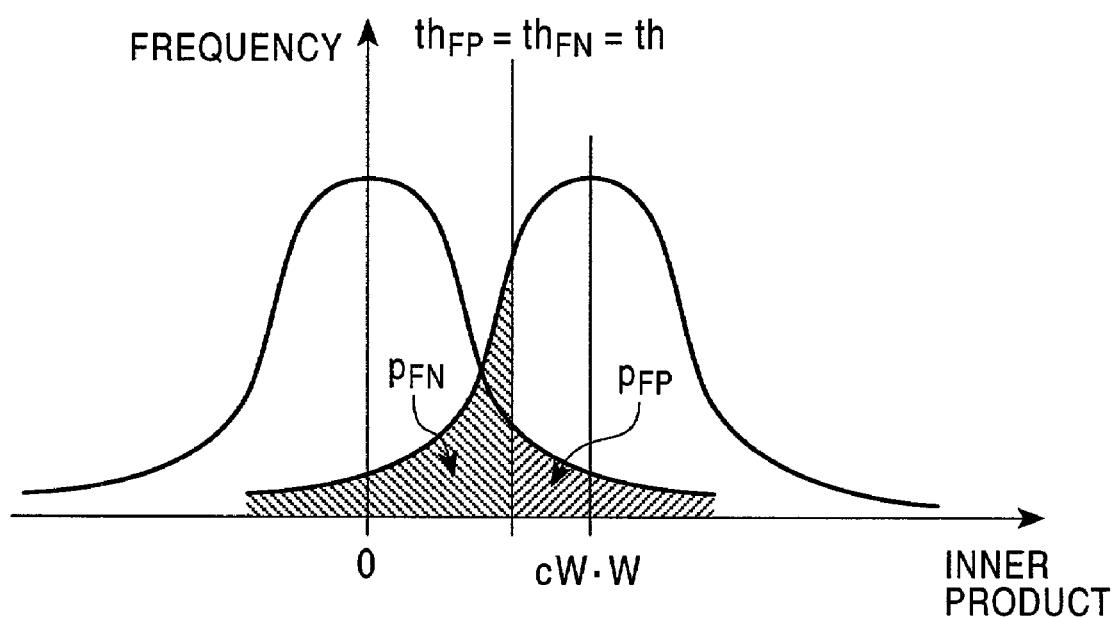
FIG. 4 is a graph showing a threshold value (th) that minimizes the amount of embedding digital watermarks.
Figure 5:
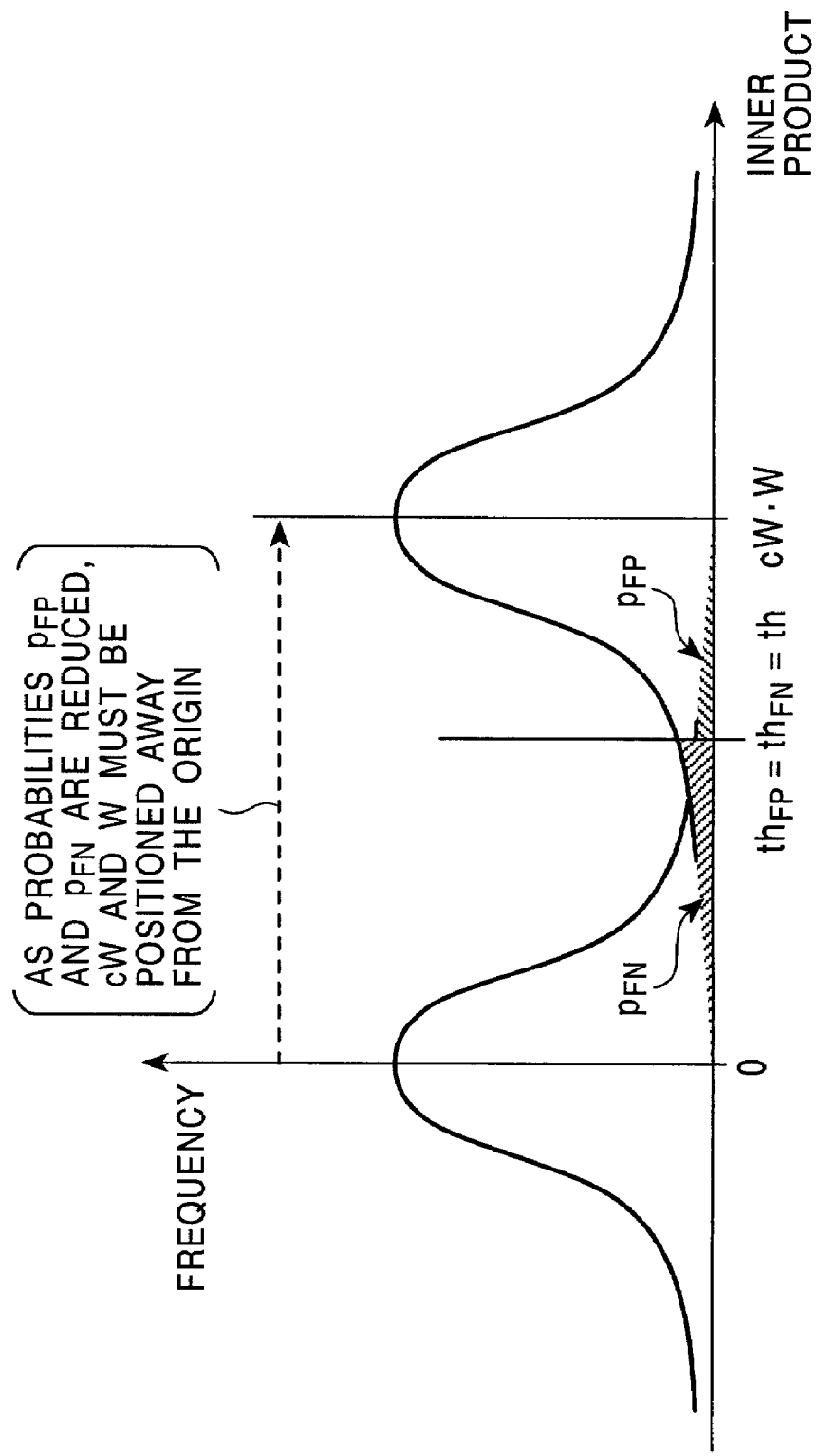
FIG. 5 is a graph showing a threshold value (th) obtained when probabilities $P_{FP}$ and $P_{FN}$ are the least.
Figure 6:
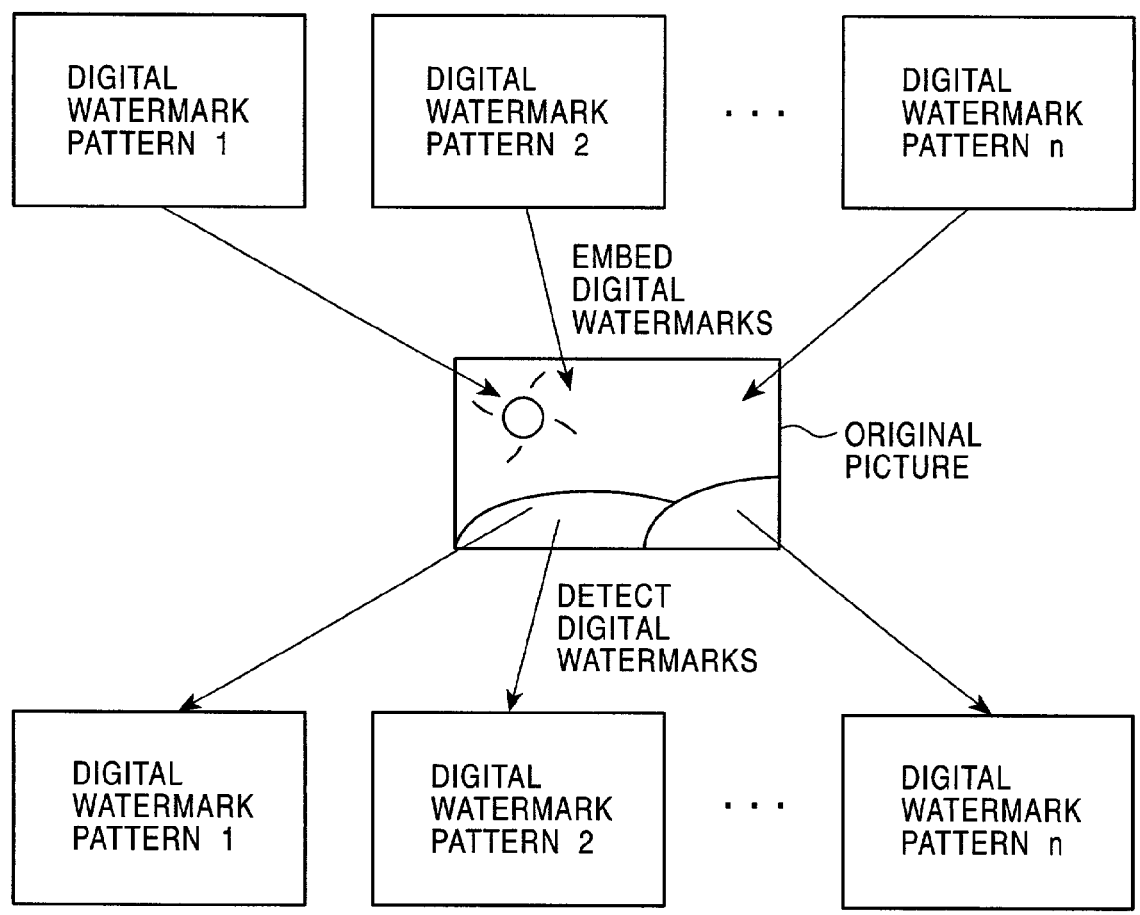
FIG. 6 is an illustration of processing for embedding a plurality of digital watermark patterns in a picture.
Figure 7:
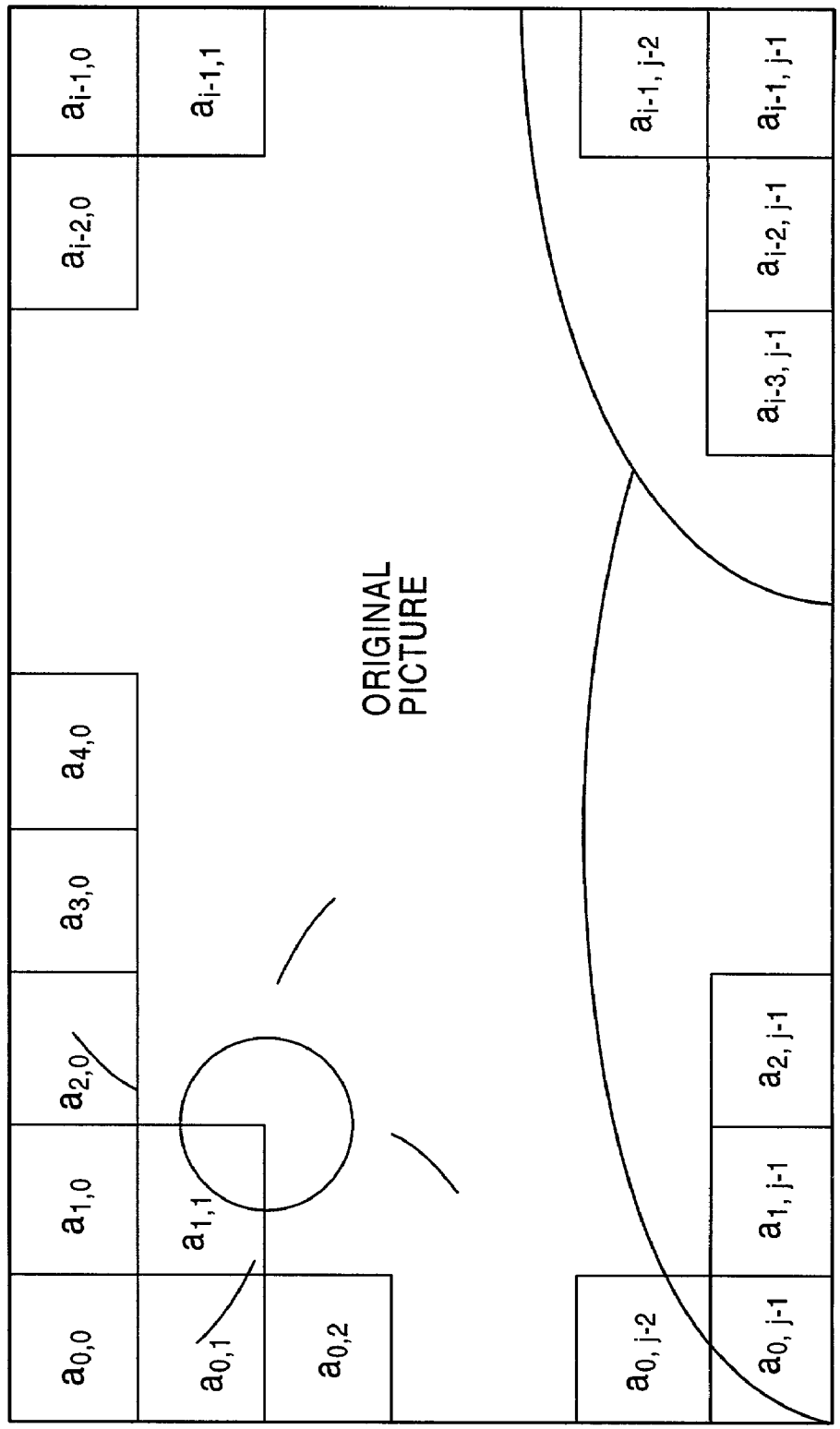
FIG. 7 is an illustration of division of an original picture into smaller areas.
Figure 20:
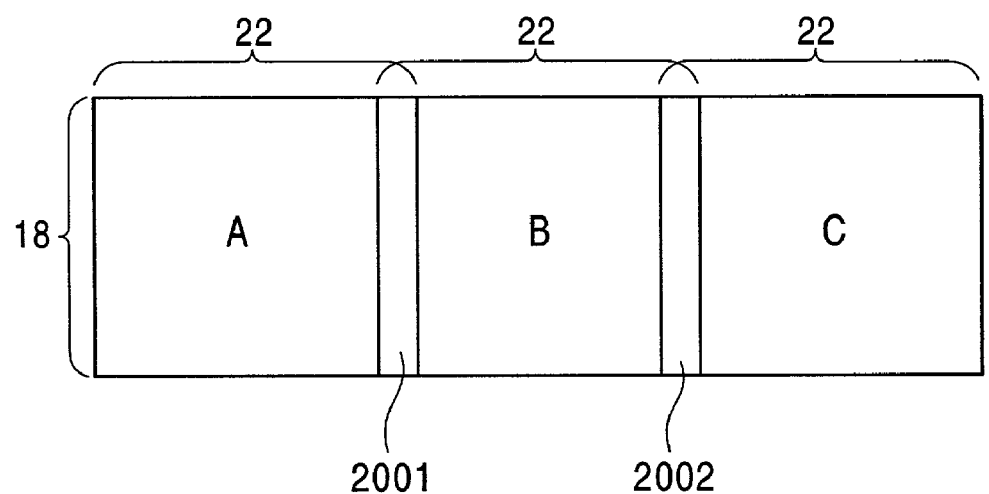
FIG. 20 is an illustration of smaller areas setting in a conversion process between an HD picture and an SD picture.

FIG. 20 shows smaller areas A, B, and C obtained by dividing the HD picture. The smaller areas A, B, and C are similar to the smaller areas A, B, and C shown in FIGS. 16 and 17. FIG. 20 shows a case obtained, for example, by embedding digital watermarks in the smaller areas (of 8 by 8 pixels) of an SD picture (see FIGS. 7 and 8), and subsequently upconverting the SD picture into the HD picture. The smaller areas (each having 8 by 8 pixels) of the SD picture before the conversion respectively correspond to the smaller areas A, B, and C of the HD picture after the conversion, which each have 22 by 18 pixels.

In each smaller area shown in FIG. 20, the overlapping portion is included in both smaller areas. In other words, for example, an overlapping portion 2001 between the smaller areas A and B is used in both the cases of detecting digital watermarks from the smaller area A and of detecting digital watermarks from the smaller area B. Also an overlapping portion 2002 between the smaller areas B and C is similarly used. The overlapping portion 2002 is used in both the cases of detecting digital watermarks from the smaller area B and of detecting digital watermarks from the smaller area C.

In the construction of the present invention, each of the smaller areas A, B, and C set in the picture (in FIG. 20) obtained by performing the picture format conversion has a predetermined size. In each smaller area having the predetermined size, a digital watermark pattern that is similar to that in the watermark-embedded picture (before the picture format conversion) can be embedded with precision and can be also detected.

An example of a digital watermark pattern $W_{HD}$ for the smaller area A is shown in FIG. 21. Although there are 18 pixels in the vertical direction in FIG. 21, the values of only the upper 9-pixel part of the pattern are shown since the upper 9-pixel part and the lower 9-pixel part have identical values. The values of elements of the digital watermark pattern $W_{HD}$ are not limited to ±1. The digital watermark pattern $W_{HD}$ completely reflects the digital watermark pattern $W_{SD}$ Of the SD picture corresponding to the smaller area A of the HD picture, and the sum of the elements of the $W_{HD}$ is zero.

Figure 22:
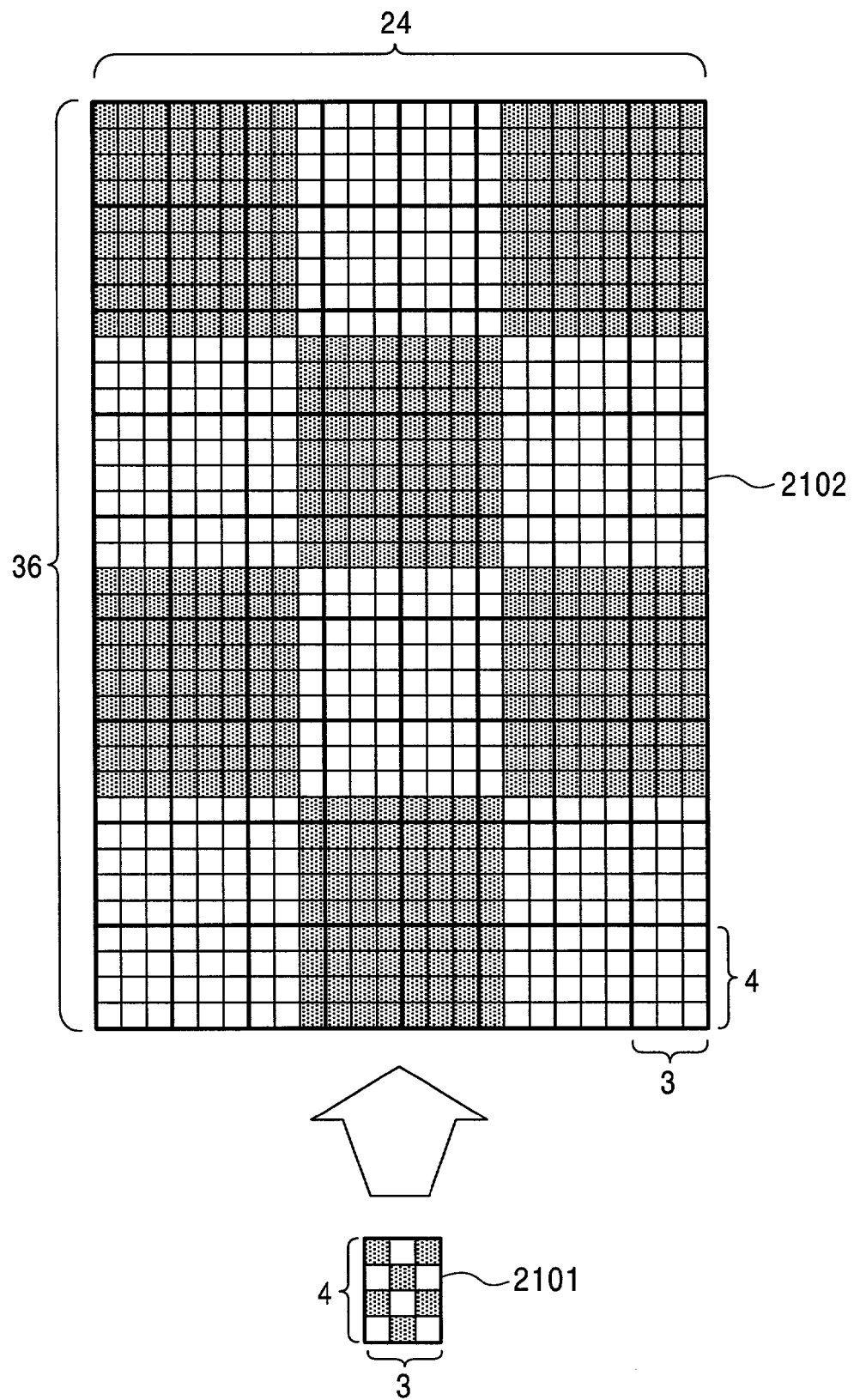
FIG. 22 is an illustration of a lowest-common-multiple picture for use in a conversion process between an HD picture and an SD picture.

An example of setting the digital watermark pattern $W_{HD}$ shown in FIG. 21 is shown in FIG. 22. When an SD picture size 2101 is converted into an HD picture size, the SD picture size 2101 has pixels represented by fractions, that is, ⅓ pixel in the horizontal direction and ¼ pixel in the vertical direction. In other words, between an SD picture having a size of 720 by 480 pixels and an HD picture having a size of 1920 by 1080 pixels, one pixel in the SD picture size corresponds to (1920/720)=(2+⅔) pixels in the horizontal direction of the HD picture, and corresponds to (1080/480) =(2+¼) pixels in the vertical direction of the HD picture. Each pixel in the SD picture size corresponds to ⅓ pixel in the horizontal direction of the HD picture size, and corresponds to ¼ pixel in the vertical direction of the HD picture size.

In order to treat these fractions as integers, a picture size 2102 that is horizontally three times the HD picture size and is vertically four times the HD picture size is assumed. Because the HD picture has a size of 1920 by 1080 pixels, the picture size 2102 has a size of (1920 by 3) by (1080 by 4) pixels, that is, 5760 by 4320 pixels. The size of 5760 by 4320 pixels is horizontally 8 times and vertically 9 times the SD picture size of 720 by 480 pixels. In other words, the picture size 2102 is the least picture size that is the multiple of both the HD picture size and the SD picture size and that is a least-common-multiple picture size.

For example, the size 3 by 4 pixels in the SD picture size corresponds to the size 24 by 36 pixels in the least-common-multiple picture size (5760 by 4320 pixels). In the least-common-multiple picture size 2102, the size 24 by 36 pixels corresponds to the size 8 by 9 pixels in the HD picture size.

In other words, the size 3 by 4 pixel in the SD picture size corresponds to the size 24 by 36 pixels in the least-common-multiple picture size (5760 by 4320 pixels), and corresponds to the size 8 by 9 pixels in the HD picture size. Accordingly, the pixels can be set as integers.

Each pixel constituting 8 by 9 pixels in the HD picture size corresponds to (24/8) by (36/9)=3 by 4 pixels in the least-common-multiple picture size (5760 by 4320 pixels). When each pixel level in a set of 3 by 4 pixels in the least-common-multiple picture size (5760 by 4320 pixels) is set as ±1 as black or white, the sum of the possible levels of the twelve pixels represented by 3 by 4 pixels is −12, . . . , +12. By setting the sum, −12, . . . , +12, obtained in the set of 3 by 4 pixels in the least-common-multiple picture size (5760 by 4320 pixels) so that it corresponds to each pixel constituting a set of 8 by 9 pixels in the HD picture size, the element values of the digital watermark pattern in the HD picture size are set as −12, . . . , +12, as shown in FIG. 21.

Regarding a case in which a picture and a digital watermark pattern to be embedded in the picture have identical sizes, the setting of the digital watermark pattern $W_{HD}$ in the HD picture, which is shown in FIGS. 21 and 22, is described again with reference to FIG. 23.

The horizontal size of an SD picture 2201 is represented by $X_{SD}$, the vertical size of the SD picture 2201 is represented by $Y_{SD}$, the horizontal size of an HD picture 2203 is represented by $X_{HD}$, and the vertical size of the HD picture 2203 is represented by $Y_{HD}$. The lowest common multiple of $X_{SD}$ and $X_{HD}$ is represented by $X_{LCM}$=1 cm($X_{SD}$, $X_{HD}$), and the lowest common multiple of $Y_{SD}$ and $Y_{HD}$ is represented by $Y_{LCM}$=1 cm($Y_{SD}$, $Y_{HD}$). As is clear from these expressions, a picture size 2202 having $X_{LCM}$ as the horizontal size, and $Y_{LCM}$ as the vertical size can be found by using a multiple of the SD picture size 2201 and of the HD picture size 2203.

By using the picture size 2202 corresponding to the least common multiple, the digital watermark pattern $W_{HD}$ in the HD picture size 2203 is found. First, the SD picture size 2201 is converted into the picture size 2202 corresponding to the least common multiple. At this time, the element values of the digital watermark pattern $W_{SD}$ in the SD picture size 2201 are also used in a digital watermark pattern $W_{LCM}$ in the picture size 2202 without being changed.

Next, the values of the digital watermark pattern $W_{LCM}$ enlarged to the picture size 2202 are grouped in each unit area 2204 corresponding to each element of the digital watermark pattern $W_{HD}$ having the HD picture size. The size of the unit area 2204 is composed of $X_{LCM}/X_{HD}$ in the horizontal direction and $Y_{LCM}/Y_{HD}$ in the vertical direction. The values grouped in each unit area 2204 of the digital watermark pattern $W_{LCM}$ corresponding to each element of the digital watermark pattern $W_{HD}$ are used as element values of the digital watermark pattern $W_{HD}$ having the HD picture size without being changed. The thus obtained digital watermark pattern $W_{HD}$ properly approximates the digital watermark pattern $W_{SD}$ having the SD picture size and satisfies expression (1). Also in a case in which a digital watermark pattern to be embedded in a picture has a size smaller the size of the picture, the way of thinking is similar.

The flow of a process for the method (shown in FIG. 23) that finds the digital watermark pattern $W_{HD}$ having the HD picture size from the digital watermark pattern $W_{SD}$ having the SD picture size is described below with reference to the flowchart shown in FIG. 24.

In step S2401, the digital watermark pattern $W_{SD}$ having the SD picture size is prepared. In step S2402, the digital watermark pattern $W_{SD}$ is enlarged to a picture size as the least common multiple of the SD picture size and the HD picture size, and the digital watermark pattern $W_{LCM}$ is found. In step S2403, the sum of element values in the digital watermark pattern $W_{LCM}$ is found in units of $(X_{LCM}/X_{HD})$ by $(Y_{LCM}/Y_{HD})$. In step S2404, each of the sums found in step S2403 is used to generate each element value in the digital watermark pattern $W_{HD}$ having the HD picture size. When all the element values of the digital watermark pattern $W_{HD}$ are set, the process ends.

Figure 24:
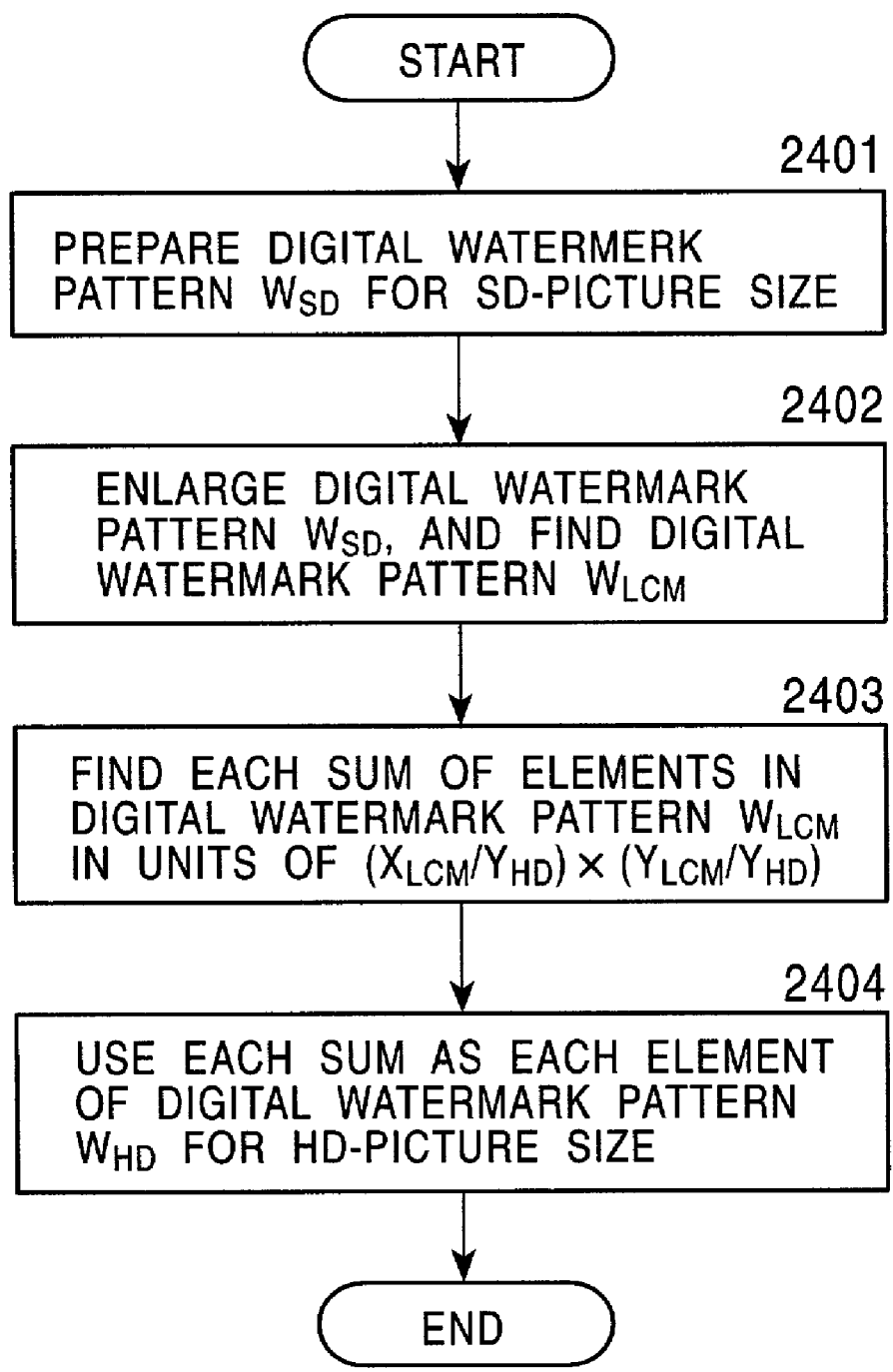
FIG. 24 is a flowchart showing a conversion process using the lowest-common-multiple picture of an SD picture and an HD picture.

The description using FIG. 23 and the process shown in FIG. 24 describe an example of processing that finds the digital watermark pattern $W_{HD}$ having the HD picture size from the digital watermark pattern $W_{SD}$ having the SD picture size. However, processing that finds the digital watermark pattern $W_{SD}$ having the SD picture size from the digital watermark pattern $W_{HD}$ having the HD picture size can be similarly executed. Also, processing between pictures having sizes different from the SD picture size and the HD picture size can be similarly executed.

As FIGS. 23 and 24 show, the picture size as the least common multiple of the SD picture size and the HD picture size is used to find the digital watermark pattern $W_{HD}$ having the HD picture size from the digital watermark pattern $W_{SD}$ having the SD picture size. However, by using the method shown in FIG. 20 of setting smaller areas in which the overlapping portions are allowed, the digital watermark pattern $W_{HD}$ having the HD picture size can be directly found from the digital watermark pattern $W_{SD}$ having the SD picture size. For example, high precision interpolation, etc., may be used. It is noted that the digital watermark pattern $W_{HD}$ must satisfy expression (1).

Figure 8:
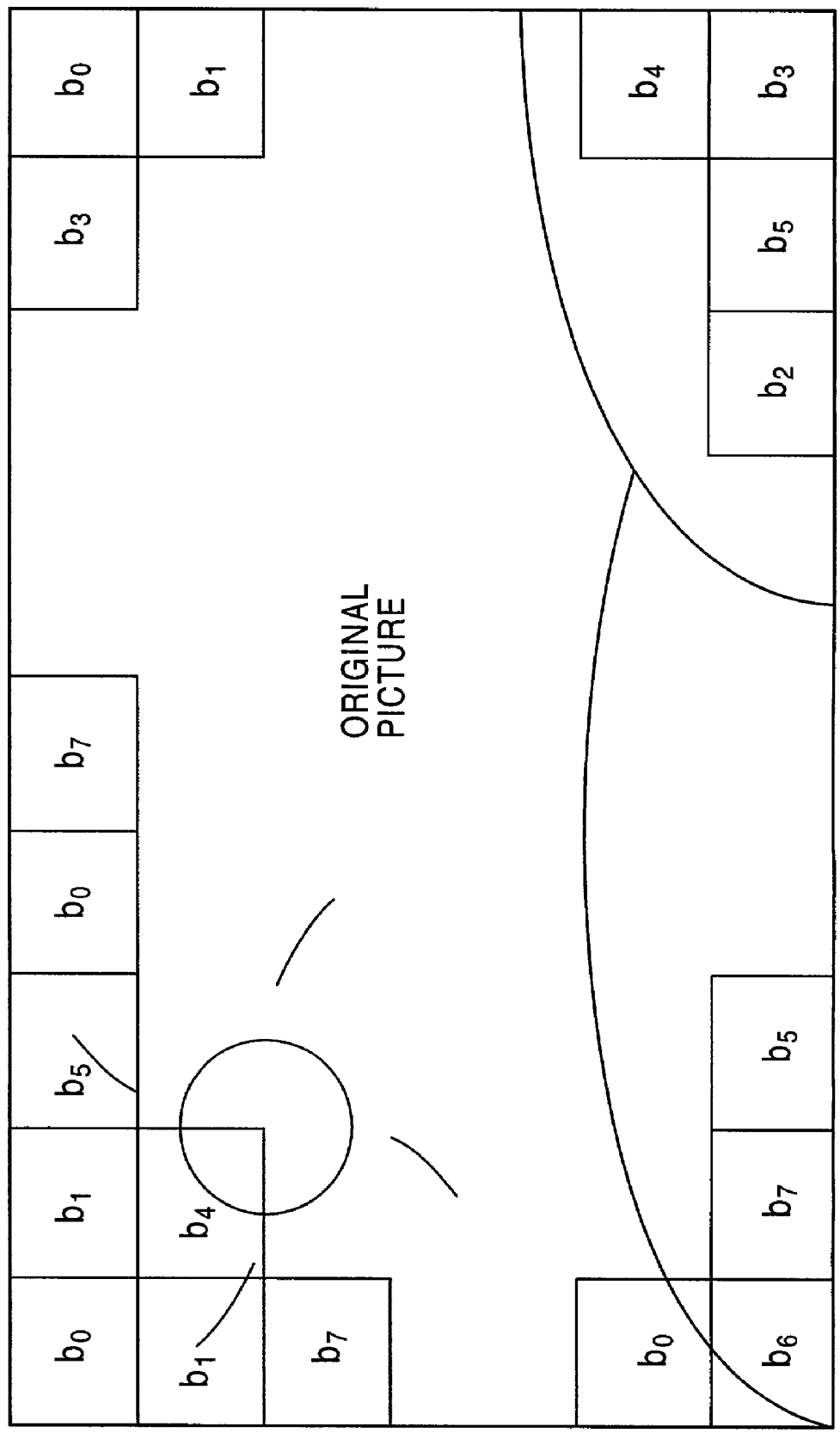
FIG. 8 is an illustration of assignment of identical information bits to a plurality of smaller areas.
Figure 9:
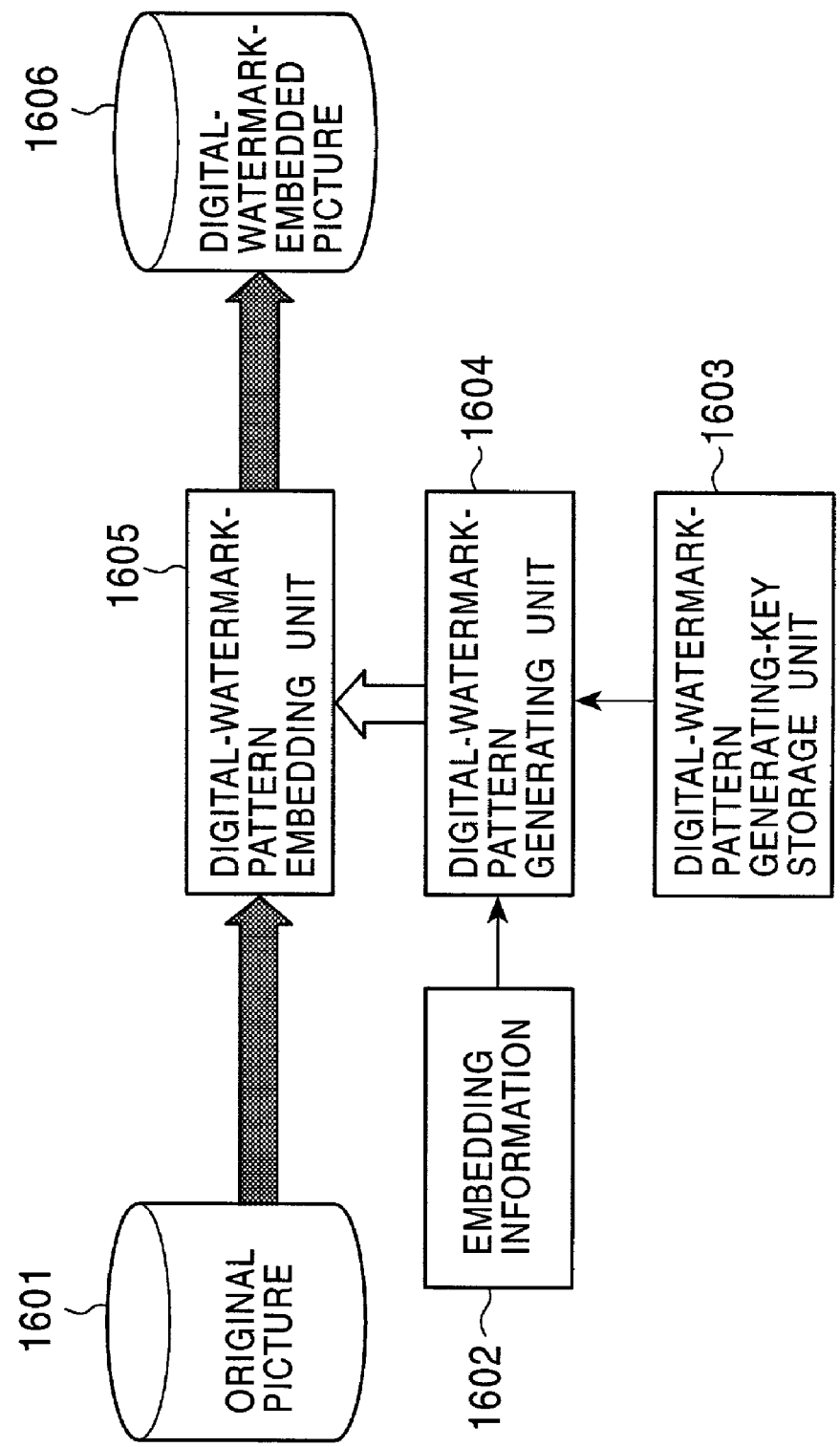
FIG. 9 is a block diagram showing a process by a digital-watermark-pattern embedding apparatus.
Figure 10:
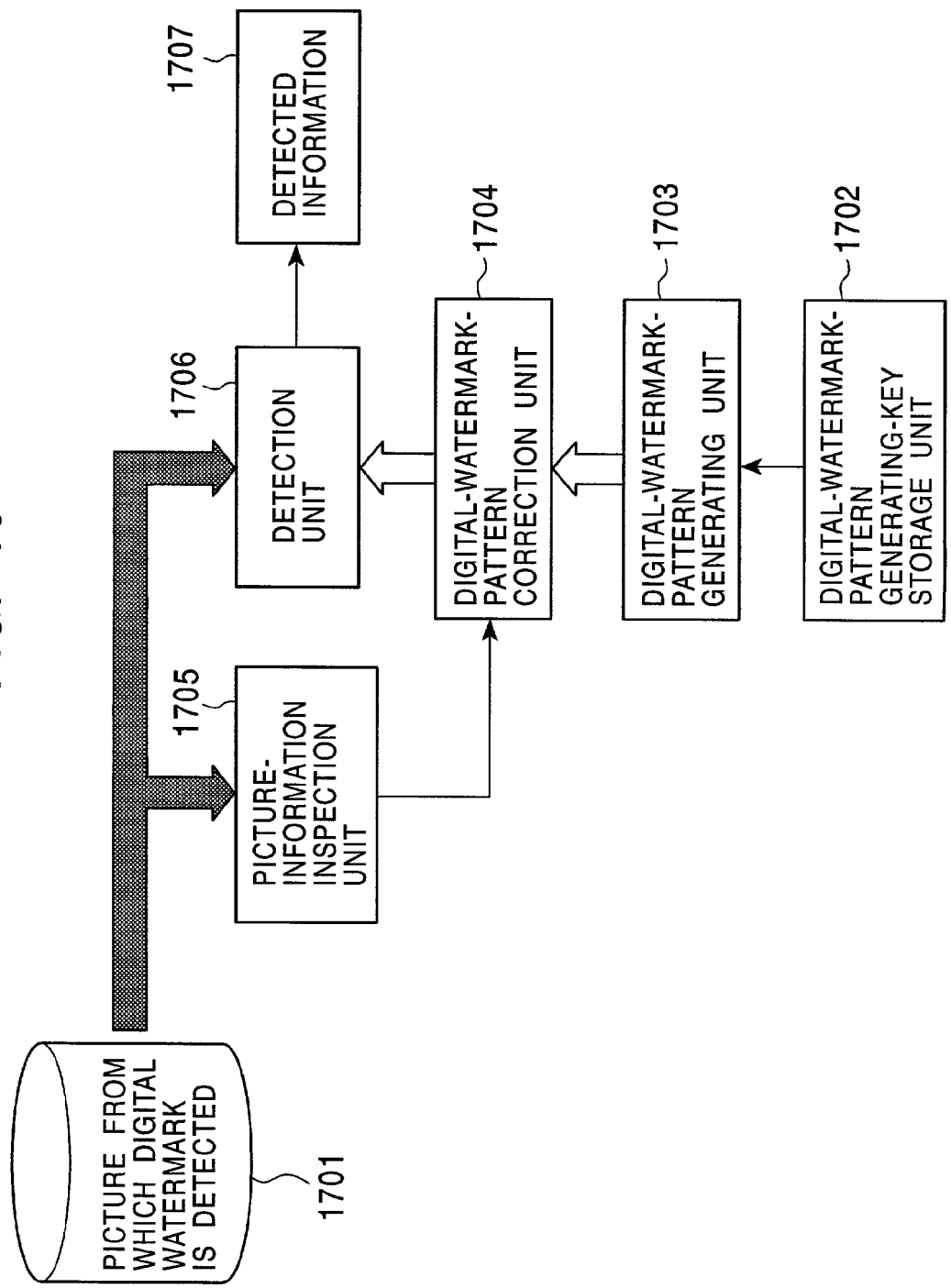
FIG. 10 is a block diagram showing a process by a digital watermark detecting processor.
Figure 11A:
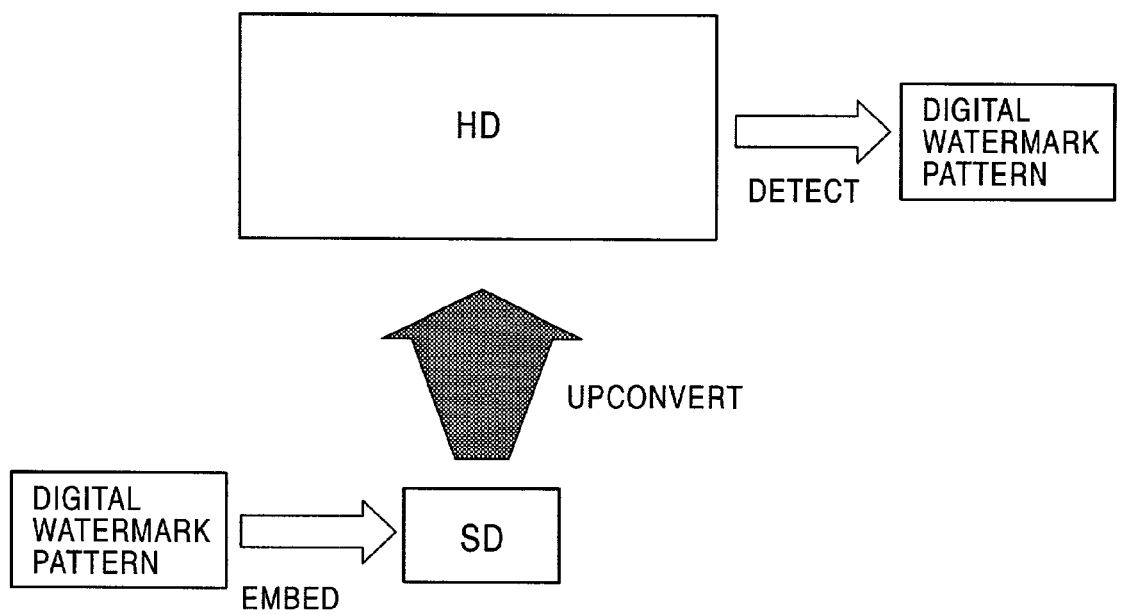
FIGS. 11A and 11B are illustrations of conversion processes between an HD picture and an SD picture.
Figure 11B:
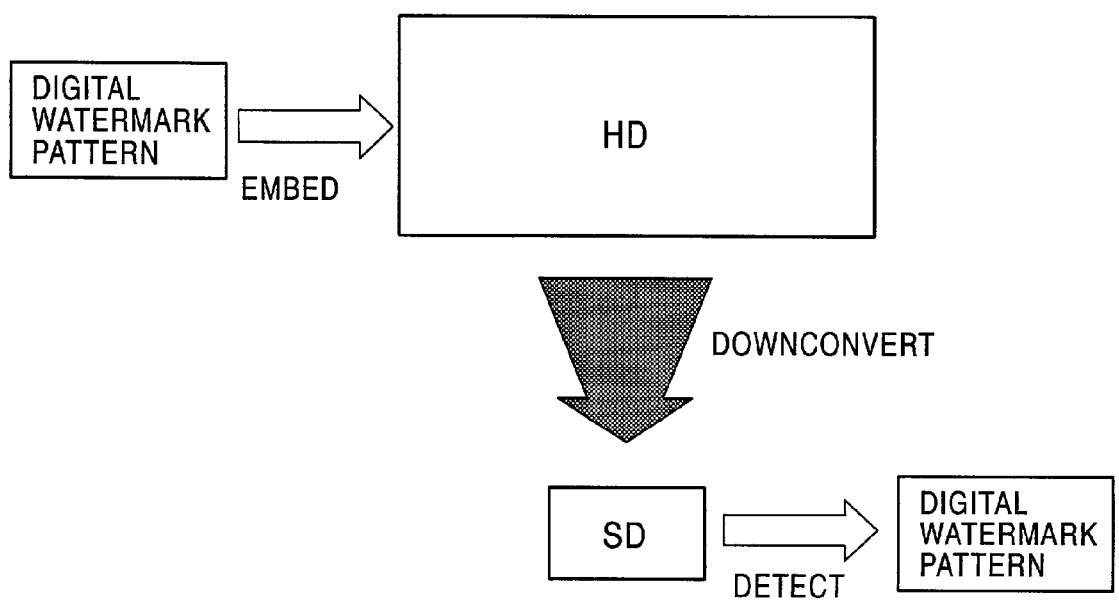
Figure 13:
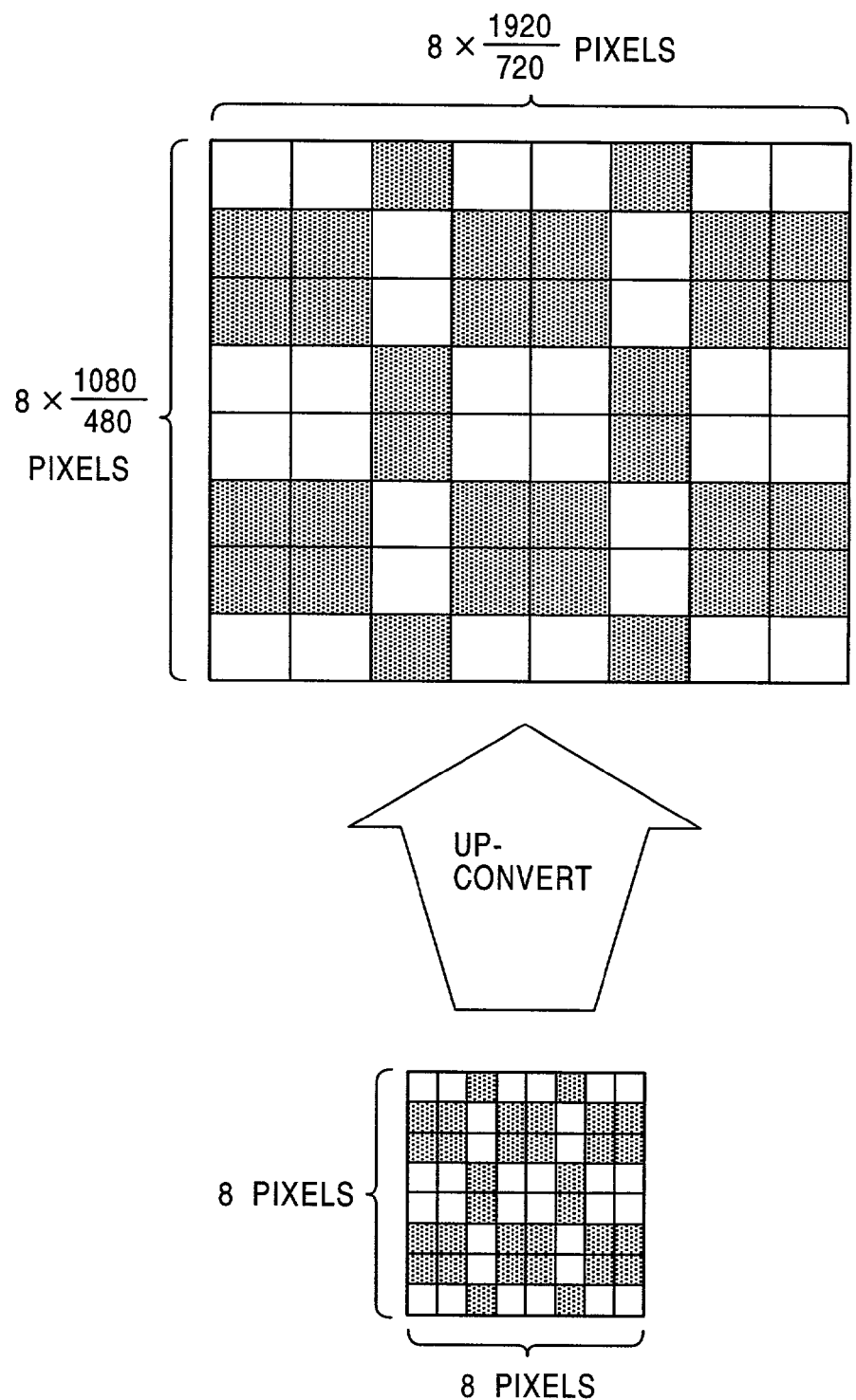
FIG. 13 is an illustration of a conversion process between an HD picture and an SD picture.
Figure 14:
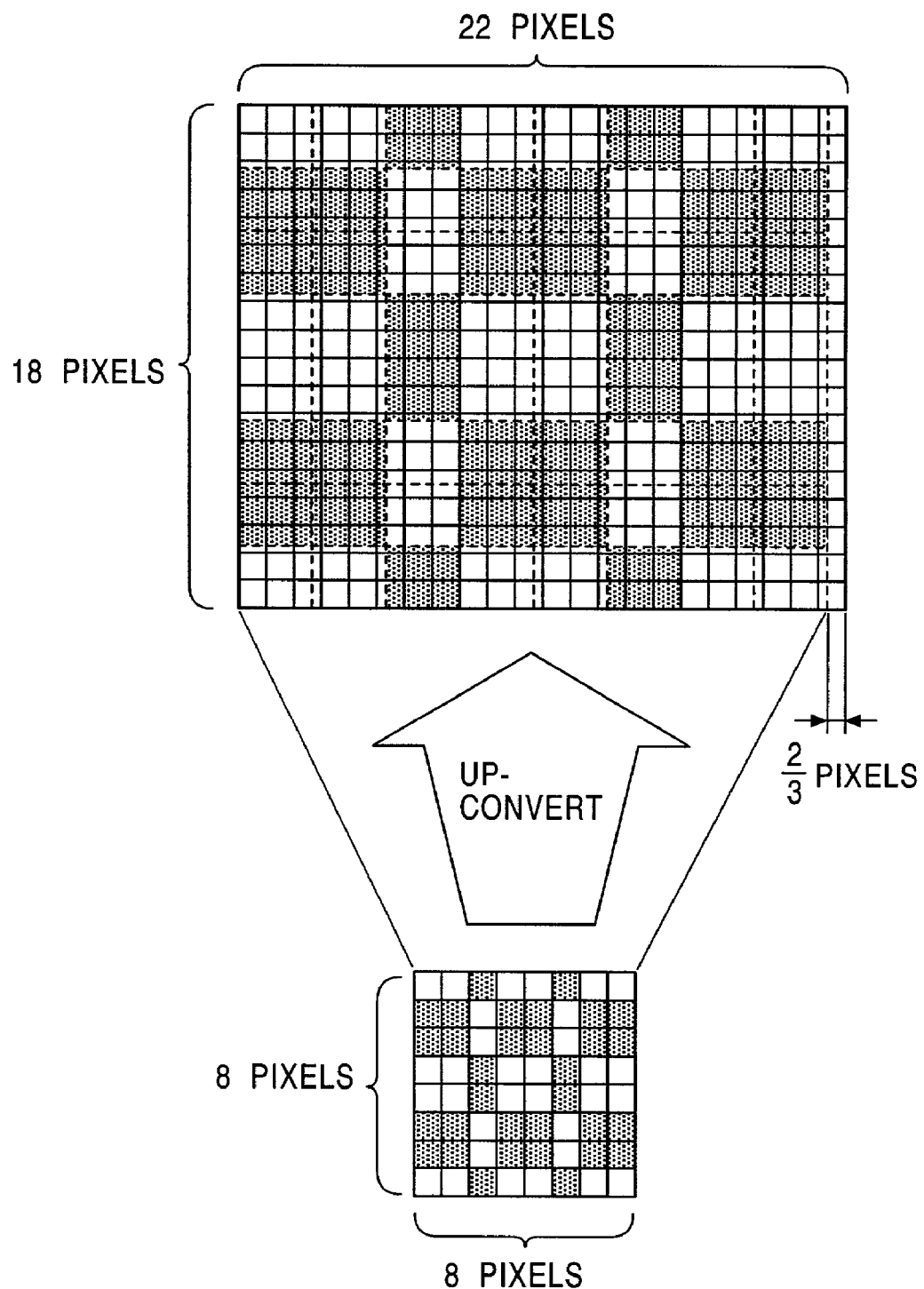
FIG. 14 is an illustration of correspondences of pixels in a conversion process between an HD picture and an SD picture.
Figure 15A:
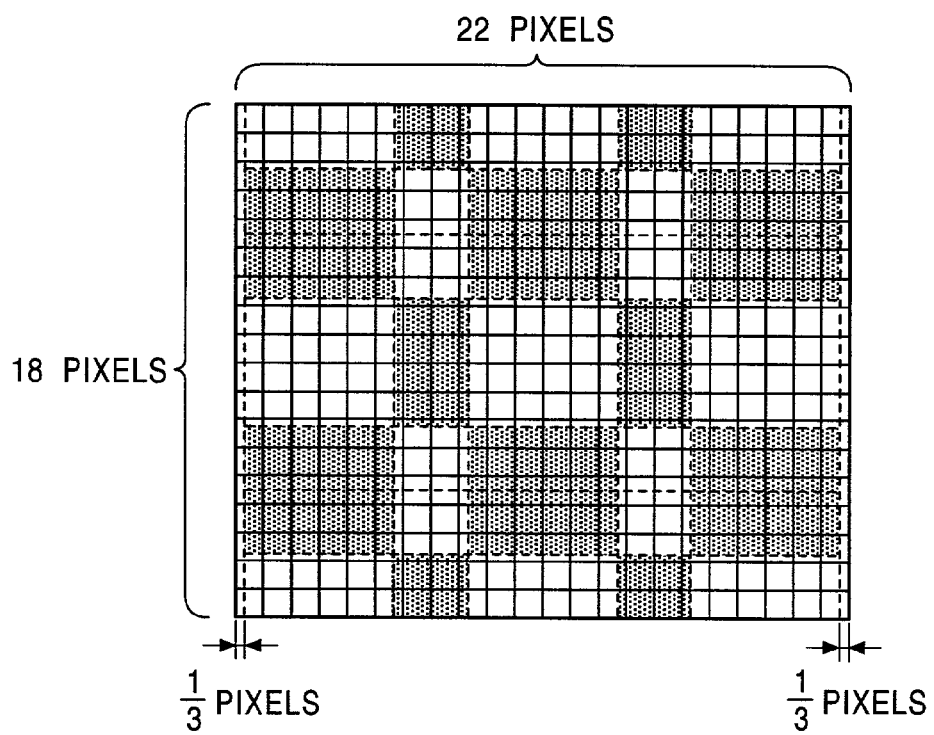
FIGS. 15A an 15B are illustrations of correspondences of pixels in a conversion process between an HD picture and an SD picture.
Figure 15B:
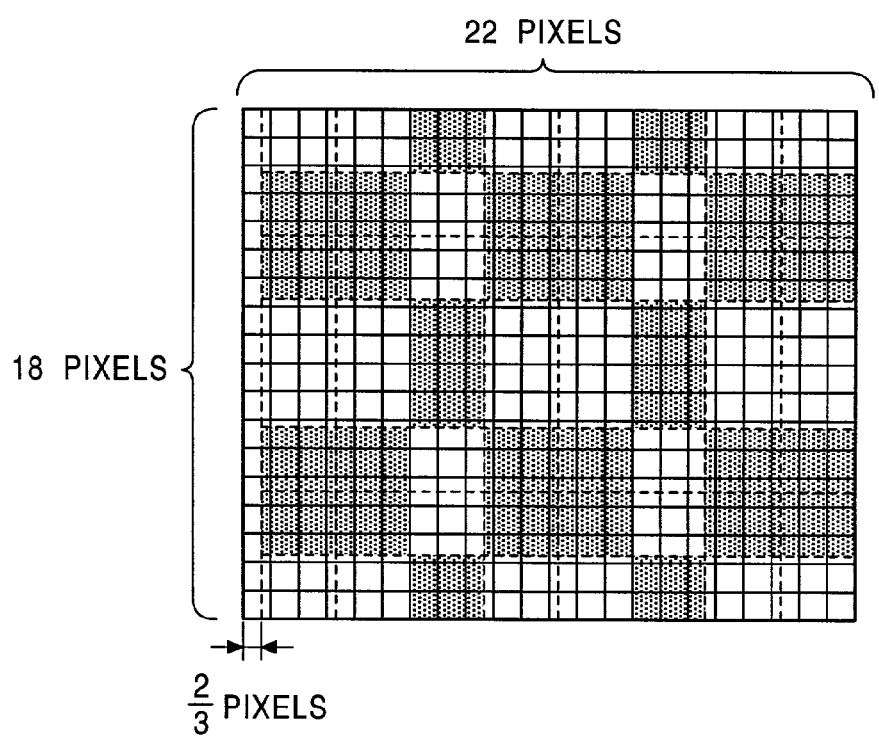
Figure 16:
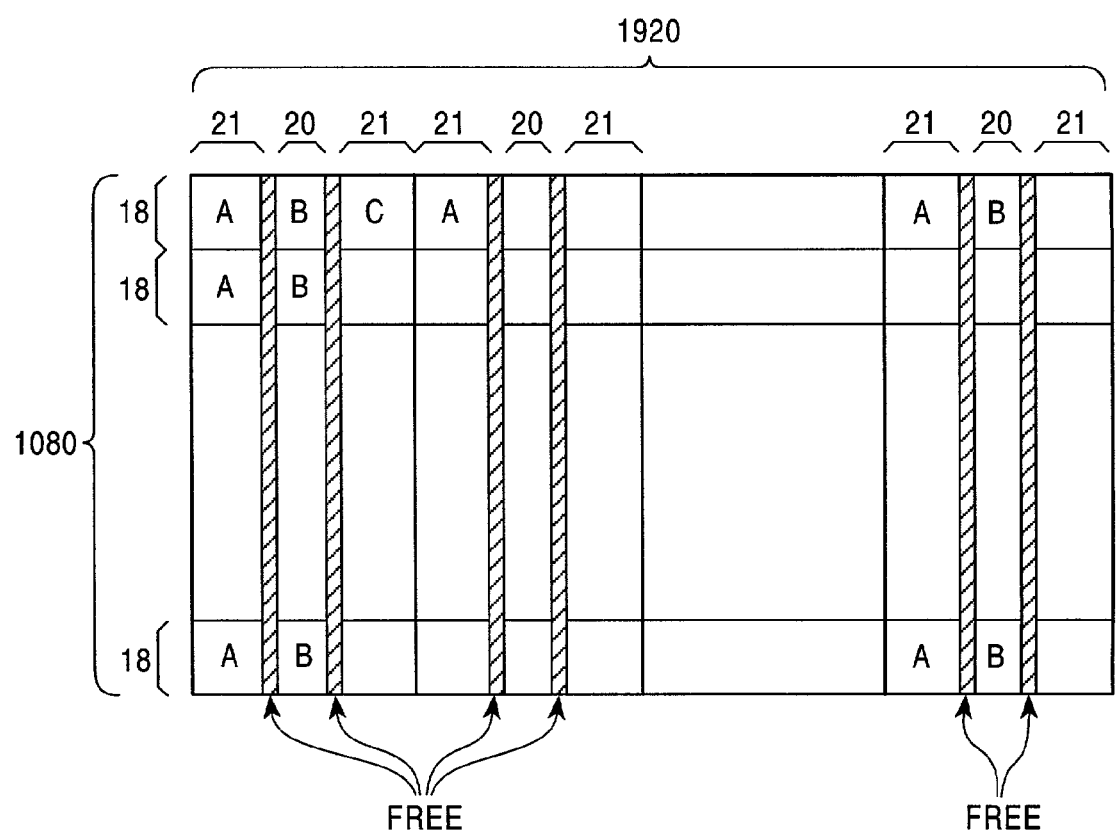
FIG. 16 is an illustration of adjustment of smaller area setting in a conversion process between an HD picture and an SD picture.
Figure 17:
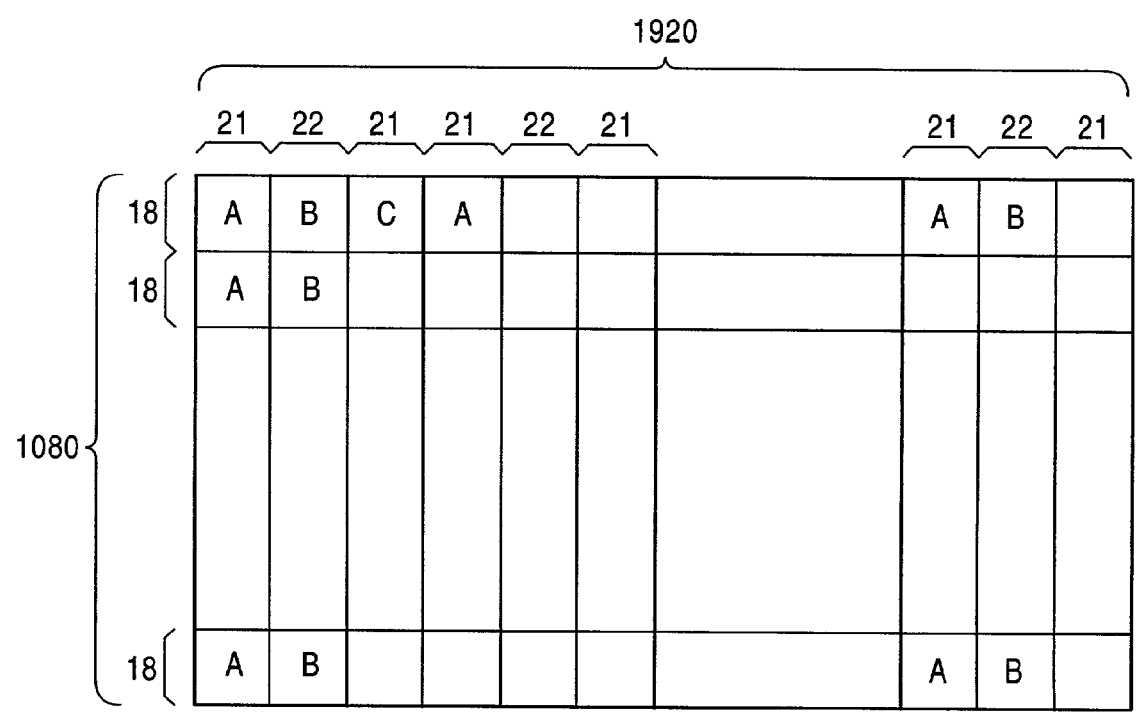
FIG. 17 is an illustration of adjustment of smaller area setting in a conversion process between an HD picture and an SD picture.
Figure 25:
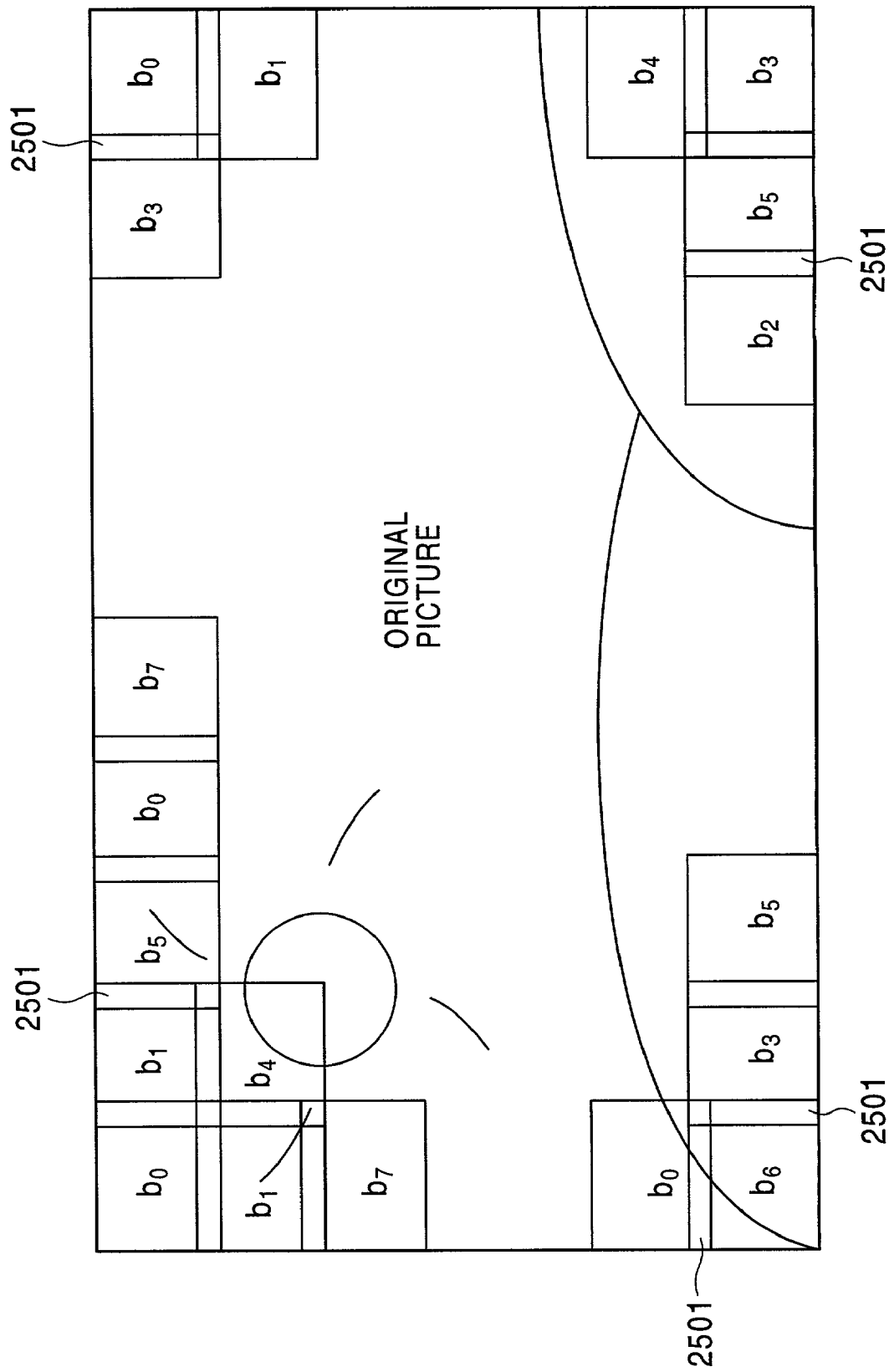
FIG. 25 is an illustration of the configuration of smaller areas having overlapping portions in a conversion process between an HD picture and an SD picture.

Although, in the SD picture size and the HD picture size that have been used in the above description, all the smaller areas do not overlap with one another as in FIG. 16, in general, there is a possibility that all the smaller areas may overlap with one another. Therefore, in consideration of overlapping, the smaller areas in the original picture size shown in FIG. 8 are processed by picture format conversion to include each overlap 2501 between adjacent smaller areas as shown in FIG. 25. Accordingly, a digital watermark pattern for use in detection must be prepared matching the smaller areas after the conversion.

When embedding digital watermarks, by using the above digital watermark pattern prepared for detection of the digital watermarks from the format-converted picture, digital watermark detection can be performed also from the format-converted picture.

By way of example, in order to most-efficiently detect digital watermarks from an SD picture, the method described using FIGS. 23 and 24 are used to create the digital watermark pattern $W_{HD}$ for the HD picture. When the digital watermark pattern $W_{HD}$ is embedded in the HD picture, a digital watermark pattern on an SD picture obtained by downconverting the watermark-embedded HD picture becomes similar to that obtained when the digital watermark pattern $W_{SD}$ for the SD picture is embedded in the SD picture.

Digital Watermark Embedding Processor

Figure 26:
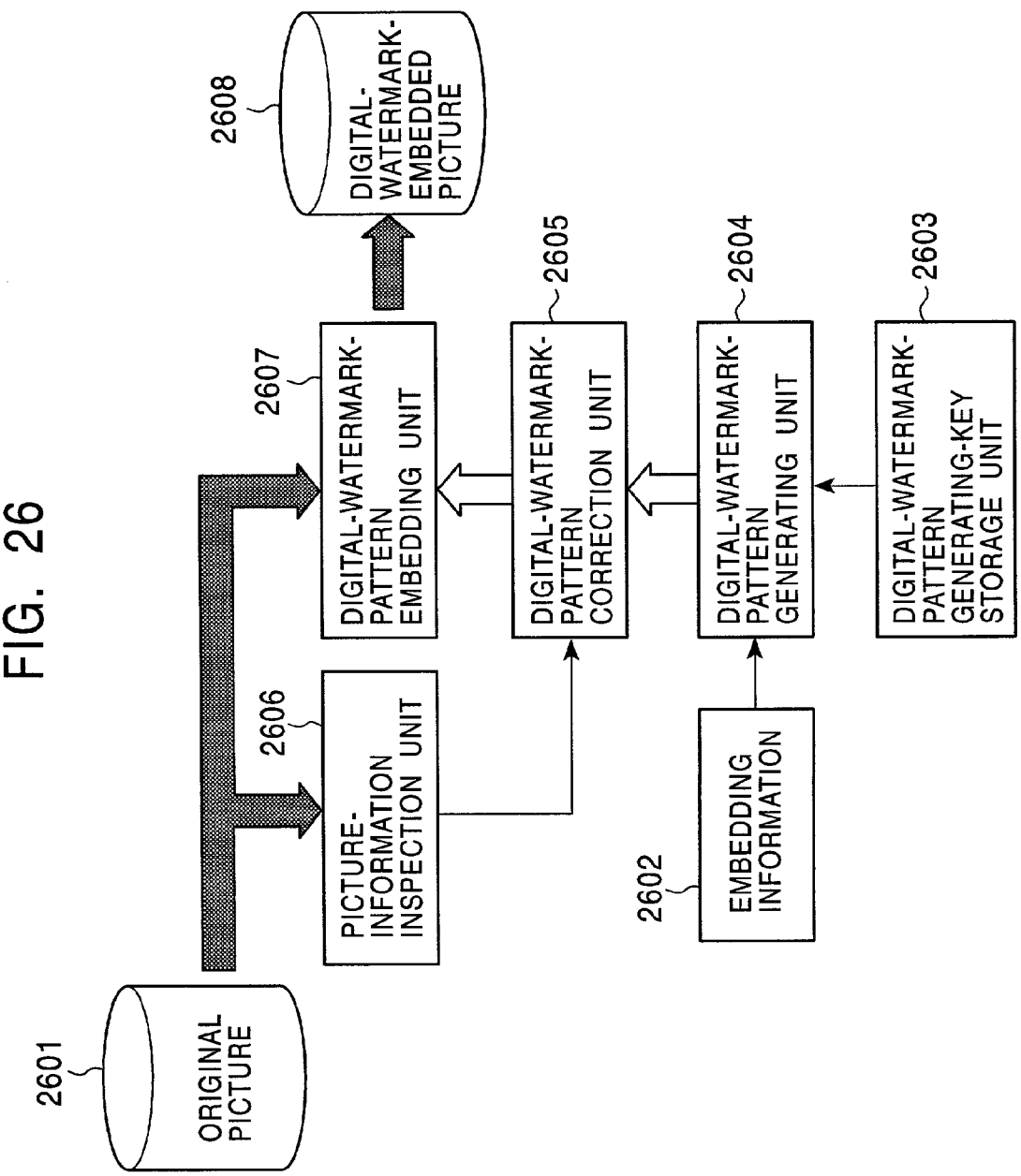
FIG. 26 is a block diagram showing an example of a process performed by a digital watermark pattern embedding apparatus that executes an embedding process after correcting a digital watermark pattern.

FIG. 26 shows an example of a process performed by a digital watermark embedding processor in which, by converting the digital watermark pattern embedded in the SD picture or the HD picture into the HD picture or the SD picture, accurate detection of digital watermarks can be performed from even the converted picture.

The types of an original picture 2601 include various pictures in which digital watermark patterns are embedded, such as pictures read from a storage medium such as a hard disk or a DVD, or a picture supplied from a picture capturing unit such as a scanner or a digital camera.

A digital-watermark-pattern generating unit 2604 generates a digital watermark pattern from embedding information 2602 to be embedded in a picture and a digital-watermark-pattern generating key stored in a digital-watermark-pattern-generating-key storage unit 2603.

The embedding information 2602 is information to be embedded as a digital watermark, and includes various types of arbitrary information, such as copy control information, copyright information, and editing information. The digital-watermark-pattern generating key is specifically picture-division information for use in embedding the digital watermark pattern in a picture, bit-arrangement information, etc., and is the process information required for generating the embedding information 2602 as a digital watermark pattern.

A digital-watermark-pattern correction unit 2605 corrects the digital watermark pattern generated by the digital-watermark-pattern generating unit 2604 in accordance with the picture format of the original picture 2601 supplied from a picture-information inspection unit 2606.

By way of example, in the process that embeds the digital watermark pattern in the HD picture, in order that the digital watermark pattern may be accurately and efficiently detected also from the SD picture, by correcting the digital watermark pattern $W_{SD}$ for the SD picture in accordance with the method described using FIGS. 23 and 24, the digital watermark pattern $W_{HD}$ for the HD picture is obtained. Also, in the process that embeds the digital watermark pattern in the SD picture, in order that the digital watermark pattern may be accurately and efficiently detected also from the HD picture, by correcting the digital watermark pattern $W_{HD}$ in accordance with the method described using FIGS. 23 and 24, the digital watermark pattern $W_{SD}$ for the SD picture is obtained.

Figure 27:
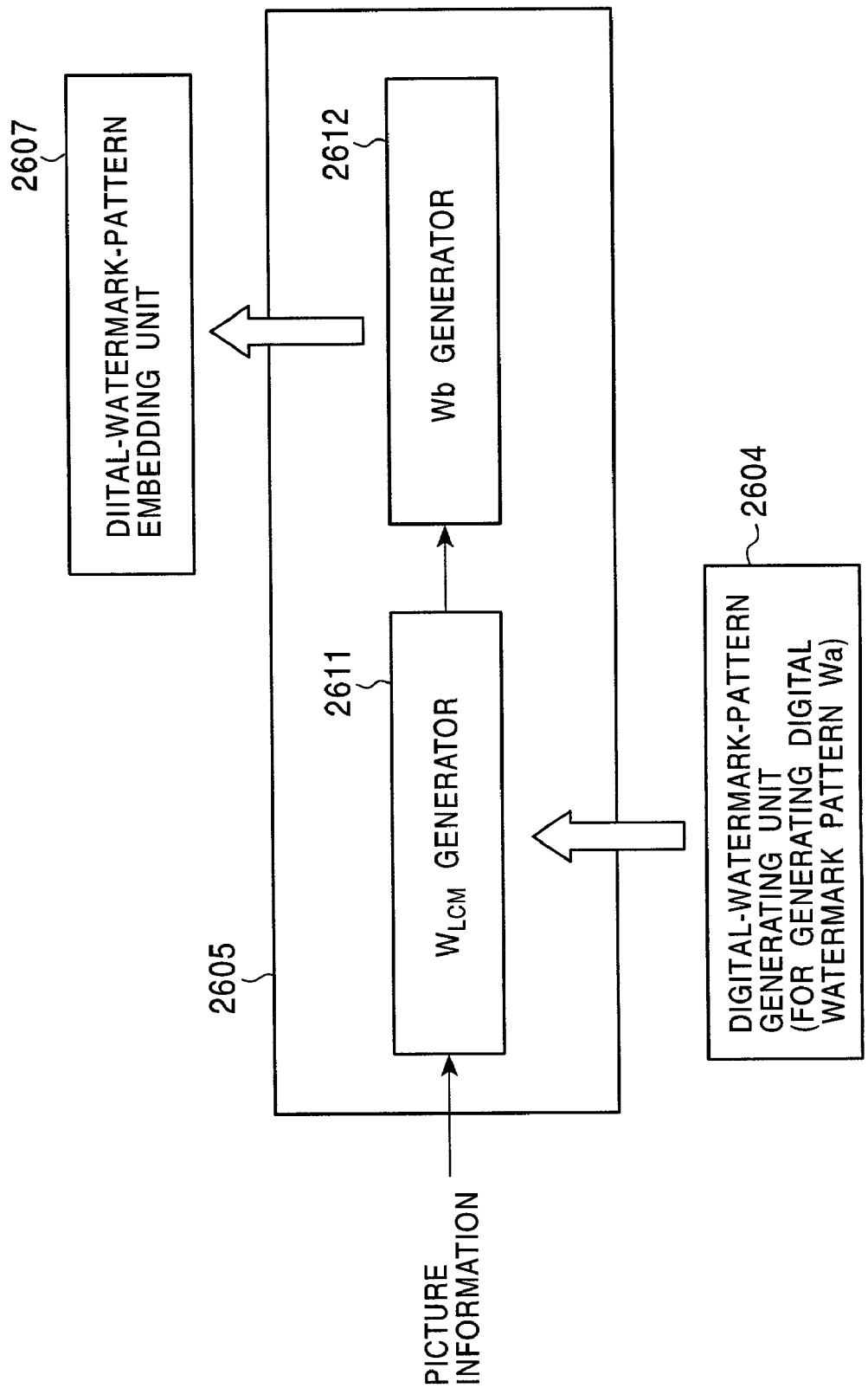
FIG. 27 is a block diagram showing the detailed structure of a digital-watermark-pattern correction unit in a digital watermark pattern embedding apparatus.

FIG. 27 shows the detailed structure of the digital-watermark-pattern correction unit 2605. The digital-watermark-pattern correction unit 2605 includes a $W_{LCM}$ generator 2611 that generates the digital watermark pattern $W_{LCM}$ in the least-common-multiple picture of the unconverted and converted pictures, and a Wb generator 2612 that generates a digital watermark pattern Wb in the unconverted picture (to be digitally watermarked). A digital-watermark-pattern generating unit 2604 generates a digital watermark pattern Wa corresponding to the unconverted picture.

Based on the picture size included in the picture information in which digital watermarks are embedded, and the converted picture size corresponding to the digital-watermark pattern generated by the digital-watermark-pattern generating unit 2604, the $W_{LCM}$ generator 2611 in the digital-watermark-pattern correction unit 2605 generates the digital watermark pattern $W_{LCM}$ in the least common multiple picture of both pictures. This is the process in accordance with step S2402 of the flowchart shown in FIG. 24.

The digital watermark pattern $W_{LCM}$ generated by the $W_{LCM}$ generator 2611 is input to the Wb generator 2612. The digital watermark pattern $W_{LCM}$ is processed in accordance with steps S2403 and S2404 shown in FIG. 24 to generate the digital watermark pattern Wb of the unconverted picture (to be digitally watermarked). The generated digital watermark pattern Wb is output to a digital-watermark-pattern embedding unit 2607. When the digital watermarks are composed of, for example, a plurality of bits, and a method of embedding the digital watermarks in smaller areas, the setting (described using FIG. 22) of smaller areas having overlapping portions is executed, the digital watermark pattern Wb is generated in accordance with the set smaller areas.

The digital-watermark-pattern embedding unit 2607 embeds, in the original picture 2601, the digital watermark pattern generated by the digital-watermark-pattern correction unit 2605. The intensity of embedding the digital watermark pattern in the edge and flat parts of the original picture 2601 is adjusted by the digital-watermark-pattern embedding unit 2607. The picture in which the digital watermark pattern is embedded is output as a digital-watermark-embedded picture 2608.

By using the constructions shown in FIGS. 26 and 27, embedding in an HD picture of a corrected digital watermark pattern can be performed so that accurate detection from an SD picture of digital watermarks can be performed, and embedding in an SD picture of a corrected digital watermark pattern can be performed so that accurate detection from an HD picture of digital watermarks can be performed.

Digital Watermark Detecting Processor

Figure 28:
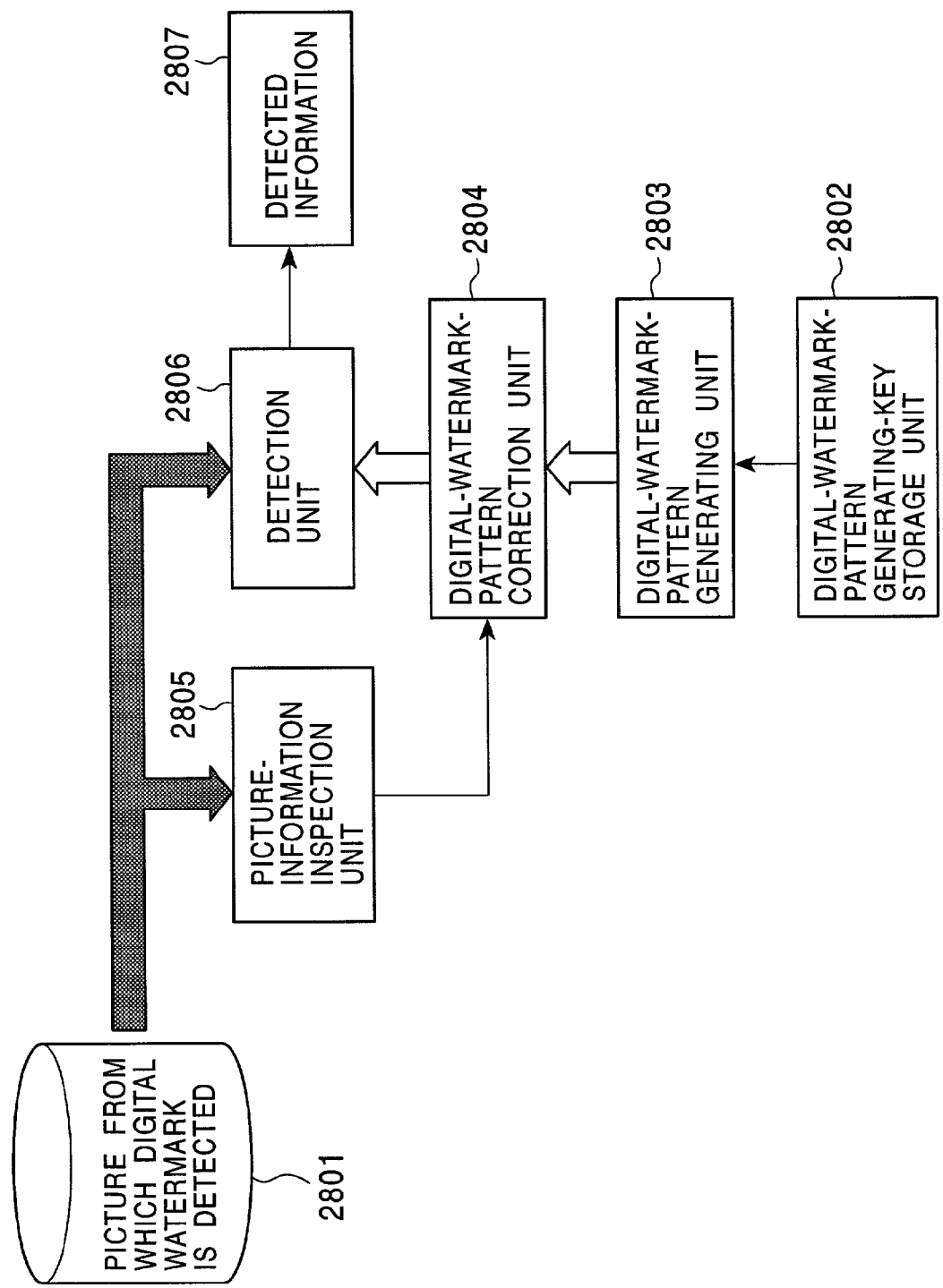
FIG. 28 is a block diagram showing an example of a process performed by a digital watermark detecting processor that execute a digital watermark detecting process after correcting a digital watermark pattern.

FIG. 28 shows an example of a process performed by a digital watermark detecting processor in which a digital watermark pattern embedded in an SD or HD picture is converted into an HD or SD picture, and accurate detection of digital watermarks can be performed from even the converted picture.

A digital-watermark-pattern generating unit 2803 generates a digital watermark pattern from a digital-watermark-pattern generating key stored in a digital-watermark-pattern-generating-key storage unit 2802.

The digital-watermark-pattern generating key is specifically picture-division information for use in embedding in a picture of a digital watermark pattern, bit-arrangement information, etc., and is the information required for detecting the digital watermark pattern.

A digital-watermark-pattern correction unit 2804 corrects the digital watermark pattern generated by the digital-watermark-pattern generating unit 2803 by using the picture format of the input picture 2801 which is supplied by a picture-information inspection unit 2805.

Figure 29:
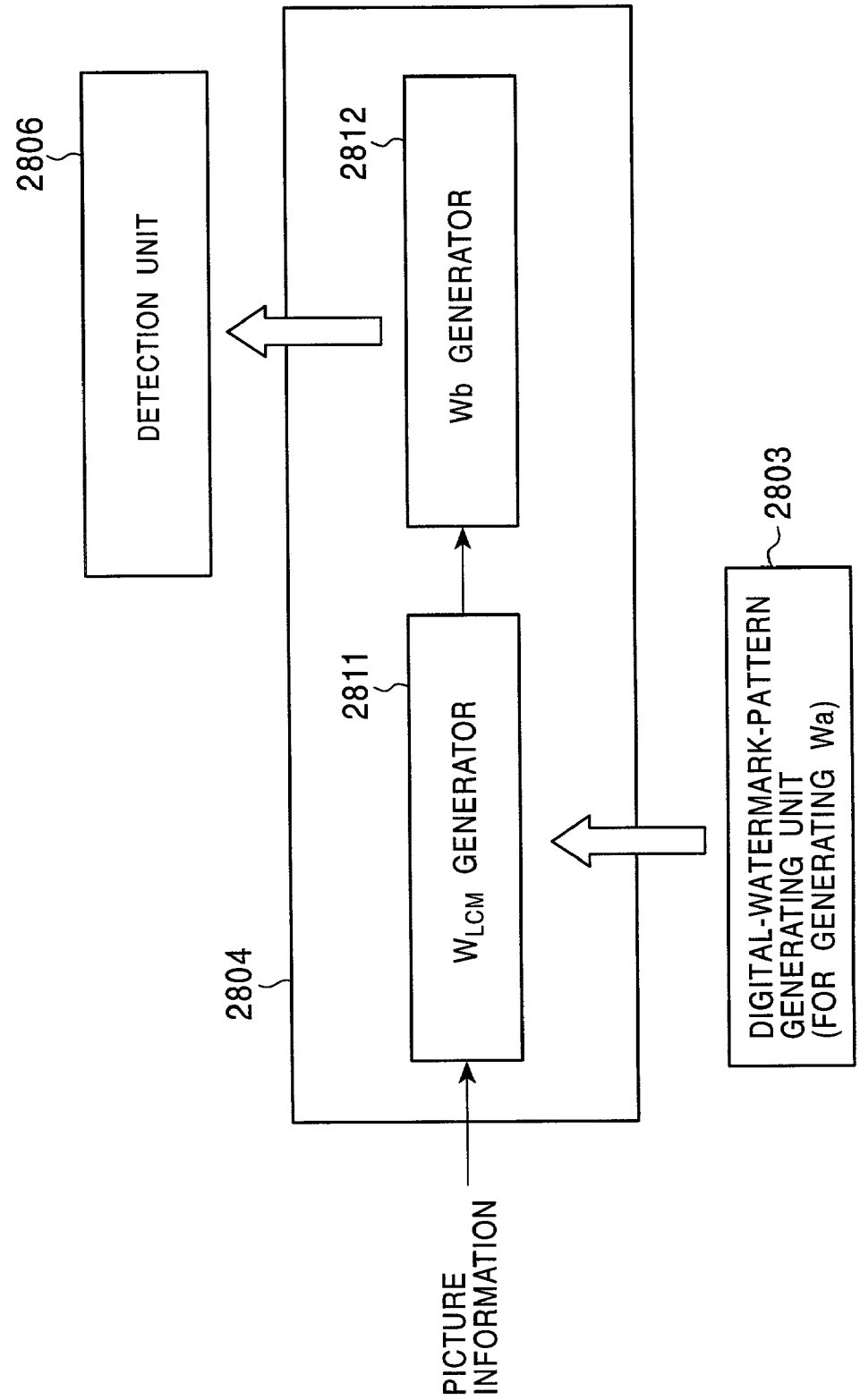
FIG. 29 is a block diagram showing the detailed structure of a digital-watermark-pattern correction unit in a digital watermark detecting processor.

FIG. 29 shows the detailed structure of the digital-watermark-pattern correction unit 2804. The digital-watermark-pattern correction unit 2804 includes a $W_{LCM}$ generator 2811 that generates a digital watermark pattern $W_{LCM}$ in the least-common-multiple picture of the unconverted and converted pictures, and a Wb generator 2812 that generates a digital watermark pattern Wb to be applied to the converted picture (having watermarks to be detected). The digital-watermark-pattern correction unit 2804 generates a digital watermark pattern Wa corresponding to the unconverted picture.

Based on the picture size included in the picture information from which digital watermarks are detected, and the picture size of the unconverted picture which corresponds to the digital watermark pattern generated by the digital-watermark-pattern generating unit 2803, the $W_{LCM}$ generator 2811 in the digital-watermark-pattern correction unit 2804 generates a digital watermark pattern $W_{LCM}$ in the least-common-multiple picture of both pictures. This is a process in accordance with step S2404 shown in FIG. 24.

The digital watermark pattern $W_{LCM}$ generated by the $W_{LCM}$ generator 2811 is input to the Wb generator 2812. The digital watermark pattern $W_{LCM}$ is processed in accordance with steps S2403 and S2404 by the Wb generator 2812 to generate a digital watermark pattern Wb for the converted picture (having watermarks to be detected). The generated digital watermark pattern Wb is output to a detection unit 2806. When the digital watermark pattern is composed of, for example, a plurality of bits, and a method of embedding the digital watermark pattern in smaller areas, the setting (described using FIG. 22) of smaller areas in which overlapping portions are allowed is executed, and the digital watermark pattern Wb is generated in accordance with the set smaller areas.

As described above, in consideration of the overlaps in the smaller areas, the smaller areas (shown in FIG. 8) in the original picture size are changed by picture format conversion to the smaller areas shown in FIG. 25 which have each overlaps 2501 between adjacent smaller areas. Accordingly, a digital watermark pattern for use in detection should be prepared in accordance with the smaller areas obtained after the conversion.

By using the setting in FIG. 20 of smaller areas in which overlaps are allowed, the digital watermark pattern $W_{HD}$ having the HD picture size can be directly detected from the digital watermark pattern $W_{SD}$ having the SD picture size. For example, high precision interpolation, etc., may be used. It is noted that the digital watermark pattern $W_{HD}$ must satisfy expression (1).

By using the digital watermark pattern Wb corrected by the digital-watermark-pattern correction unit 2804, the detection unit 2806 detects the digital watermarks from the input picture 2801. The information detected by the detection unit 2806 is output as detected information 2807.

By using the constructions shown in FIGS. 28 and 29, accurate detection of digital watermarks can be performed from even a picture obtained by performing conversion between the SD picture and the HD picture after embedding digital watermarks.

System Configuration

Figure 30:
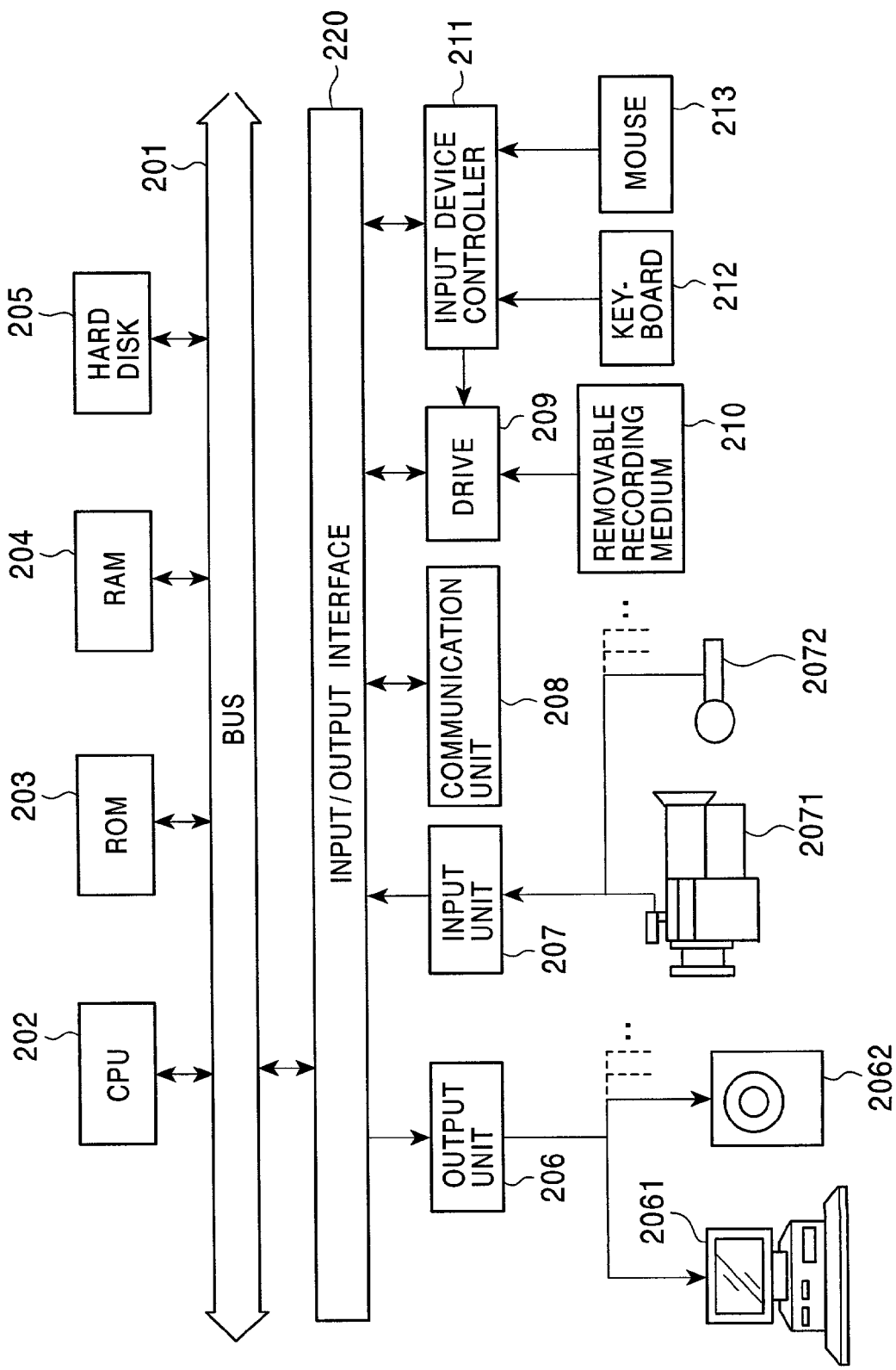
FIG. 30 is a block diagram showing an example of a system that executes one of generation, embedding, and detection of digital watermarks.

The above consecutive processes in the embodiment can be executed by either hardware or software or by a composite construction of both. When software is used to execute the processes, a program containing a processing sequence may be executed after being installed in a memory in a data processor built in dedicated hardware, or after being installed in a multipurpose computer capable of executing various types of processing. When the consecutive processes are executed by software, programs constituting the software are installed in, for example, a multipurpose computer or a single-chip microcomputer. FIG. 30 shows an example of the system configuration of an apparatus that executes the consecutive processes, specifically, any one process among generation, embedding, and detection of digital watermarks.

The system includes a central processing unit (CPU) 202. The CPU 202 actually executes various types of application programs and an operating system. A read-only memory (ROM) 203 stores a program that the CPU 202 executes, or fixed data as arithmetic parameters. A random access memory (RAM) 204 is used as a storage area for the program executed by the CPU 202 and parameters that vary as required in processing of the program, and is used as a work area. The CPU 202, the ROM 203, the RAM 204, and a hard disk 205 are connected by a bus 201 so that data can be mutually transferred. Also, they can exchange data with various types of input/output units connected to an input/output interface 220.

A keyboard 212 and a mouse 213 are operated for inputting various commands and data to the CPU 202 by the user. The input commands and data are input via an input device controller 211.

A drive 209 is used to perform recording to or playback of a removal recording medium 210 such as a floppy disk, a compact-disk read-only memory (CD-ROM), a magneto-optical (MO) disk, a digital versatile disk (DVD), a magnetic disk, or a semiconductor memory. The drive 209 plays back a program or data from the removal recording medium 210, or stores a program or data on the removal recording medium 210.

When a command is input from the keyboard 212 or the mouse 213 to the CPU 202 via the input/output interface 220, the CPU 202 executes a program stored in the ROM 203 in response to the input command.

In the above embodiment, a picture to be digitally watermarked, or a picture having digital watermarks to be detected can be input from an input device such as a camera 2071 connected to an input unit 207, for example, a data input device such as a scanner, or from the removal recording medium 210 loaded into the drive 209, such as the floppy disk, the CD-ROM, the MO disk, the DVD, the magnetic disk, or the semiconductor memory. In this system, audio data can be also input from a microphone 2072. In addition, data received by a communication unit 208 can be processed as picture data to be digitally watermarked or as picture data having digital watermarks to be detected.

In addition to the program stored in the ROM 203, after loading, into the RAM 204, a program stored in the hard disk 205, a program that is installed in the hard disk 205 after being transferred from a satellite or a network and being received by the communication unit 208, or a program that is installed in the hard disk 205 after being read from the removal recording medium 210, which is loaded into the drive 209, the CPU 202 can execute the loaded program.

In the system in FIG. 30, the CPU 202 executes processes in accordance with the above-described example in the embodiment, or processes in accordance with the above-described block diagrams and flowcharts. The CPU 202 outputs the results of the processes, as required, by using the input/output interface 220 and an output unit 206 from a display unit 2061 such as a liquid crystal display or a cathode-ray tube or from a speaker 2062. Also, processing data can be transmitted from the communication unit 208, and can be stored in a recording medium such as the hard disk 205 or the like.

Programs for executing the various processes can be recorded beforehand in the hard disk 205 or the ROM 203 as a recording medium built into the system. Alternatively, the programs can be temporarily or eternally stored (recorded) in the removal recording medium 210 such as the floppy disk, the CD-ROM, the MO disk, the DVD, the magnetic disk, or the semiconductor memory. The removal recording medium 210 of the above type can be provided as so-called "package software".

In addition to installation into a computer of the programs from the removal recording medium 210 as described above, after transferring the programs by radio from a download site to a computer via a digital broadcasting satellite, or after transferring the programs by wire via a network such as a local area network or the Internet, the transferred programs can be received by the communication unit 208 and can be installed in the hard disk 205 of the computer.

In this Specification, processing steps constituting each program for controlling the computer to perform a type of process is not always time-sequentially executed in the order represented by a flowchart, and include processes (e.g., parallel processes or object-based processes) that are executed in parallel or separately.

In addition, each program may be processed by a single computer or may be distributively processed by a plurality of computers. Also, the program may be transferred and executed by a remote computer.

The present invention has been fully described with reference to a specified embodiment. However, it is obvious that a person skilled in the art will modify and substitute the embodiment without departing from the gist of the present invention. Although the embodiment has described HD and SD signals have been described as those to be digitally watermarked and those having digital watermarks to be detected, the constructions in the present invention are not limited to these specified picture signals, but can be applied to signals on which format-conversion processing is performed. In other words, the present invention has been disclosed in the form of exemplification, and thus should not be interpreted in limited sense. To determine the gist of the present invention, the appended claims should be considered.

Various types of processes described in this Specification not only may be time-sequentially executed in the described order, but also may be executed in parallel or separately in accordance with the processing ability of an apparatus that executes the processes or as required. In this Specification, the system is a logical set of a plurality of devices, and is not limited to a form in which the devices are accommodated in a single housing.

What is claimed is:

1. A digital watermark embedding processor for executing digital-watermark-pattern embedding processing on data, said digital watermark embedding processor comprising:
digital-watermark-pattern generating means for generating a digital watermark pattern corresponding to a first picture format set beforehand;
digital-watermark-pattern correcting means for generating a corrected digital watermark pattern based on the generated digital watermark pattern, the corrected digital watermark pattern corresponding to a second picture format different from said first picture format; and
digital-watermark-pattern embedding means for executing a process of embedding the corrected digital watermark pattern in the data, wherein said data is divided into smaller areas in which an overlapping portion is provided between adjacent smaller areas, and said digital-watermark-pattern correcting means uses said smaller areas as areas to be digitally watermarked by embedding digital watermarks.

2. The digital watermark embedding processor according to claim 1, wherein said digital-watermark-pattern correcting means comprises:
  lowest-common-multiple-picture digital-watermark-pattern generating means for calculating a least-common-multiple picture size of said first picture format and said second picture format and for generating for the calculated least-common-multiple picture size a lowest-common-multiple-picture digital watermark pattern corresponding to the digital watermark pattern generated by said digital-watermark-pattern generating means; and
  second-picture-format digital-watermark-pattern generating means for executing, based on the generated lowest-common-multiple-picture digital watermark pattern, a process of generating a digital watermark pattern corresponding to said second picture format.

3. The digital watermark embedding processor according to claim 1, wherein said digital-watermark-pattern correcting means generates a corrected digital watermark pattern in which a sum of values set for pixels of the digital watermark pattern is zero.

4. The digital watermark embedding processor according to claim 1, wherein said first picture format and said second picture format are a high definition format and a standard definition format, respectively.

5. A digital watermark embedding-processing method for executing digital-watermark-pattern embedding processing on data, said digital watermark embedding-processing method comprising:
  a digital-watermark-pattern generating step for generating a digital watermark pattern corresponding to a first picture format set beforehand;
  a digital-watermark-pattern correcting step for generating a corrected digital watermark pattern based on the generated digital watermark pattern, the corrected digital watermark pattern corresponding to a second picture format different from said first picture format; and
  a digital-watermark-pattern embedding step for embedding the corrected digital watermark pattern in the data, wherein said data is divided into smaller areas in which an overlapping portion is provided between adjacent smaller areas, and in said digital-watermark-pattern correcting step said smaller areas are used as areas to be digitally watermarked by embedding digital watermarks.

6. The digital watermark embedding-processing method according to claim 5, wherein said digital-watermark-pattern correcting step includes:
  a lowest-common-multiple-picture digital-watermark-pattern generating step which calculates the least-common-multiple picture size of the sizes of said first picture format and said second picture format, and generates for the calculated least-common-multiple picture size a lowest-common-multiple-picture digital watermark pattern corresponding to the digital watermark pattern generated in said digital-watermark-pattern generating step; and
  a second-picture-format digital-watermark-pattern generating step of executing based on the generated lowest-common-multiple-picture digital watermark pattern a process of generating a digital watermark pattern corresponding to said second picture format.

7. The digital watermark embedding-processing method according to claim 5, wherein said digital-watermark-pattern correcting step includes the step of generating a corrected digital watermark pattern in which a sum of values set for pixels of the digital watermark pattern is zero.

8. The digital watermark embedding-processing method according to claim 5, wherein said first picture format and said second picture format are a high definition format and a standard definition format, respectively.

9. A digital watermark detecting processor for executing digital-watermark-pattern detecting processing on data, said digital watermark pattern detecting processor comprising:
  digital-watermark-pattern generating means for generating a digital watermark pattern corresponding to a first picture format set beforehand;
  digital-watermark-pattern correcting means for generating a corrected digital watermark pattern based on the generated digital watermark pattern, the corrected digital watermark pattern corresponding to a second picture format different from said first picture format; and
  detection means for executing a digital-watermark-pattern detecting processing based on the corrected digital watermark pattern, wherein said data is divided into smaller areas in which an overlapping portion is provided between adjacent smaller areas, and said digital-watermark-pattern correcting means uses said smaller areas as areas to be digitally watermarked by embedding digital watermarks.

10. The digital watermark detecting processor according to claim 9, wherein said digital-watermark-pattern correcting means comprises:
  lowest-common-multiple-picture digital-watermark-pattern generating means for calculating a least-common-multiple picture size of said first picture format and said second picture format and for generating for the calculated least-common-multiple picture size a lowest-common-multiple-picture digital watermark pattern corresponding to the digital watermark pattern generated by said digital-watermark-pattern generating means; and
  second-picture-format digital-watermark-pattern generating means for executing based on the generated lowest-common-multiple-picture digital watermark pattern, executes a process of generating a digital watermark pattern corresponding to said second picture format.

11. The digital watermark detecting processor according to claim 9, wherein said digital-watermark-pattern correcting means generates a corrected digital watermark pattern in which a sum of values set for pixels of the digital watermark pattern is zero.

12. The digital watermark detecting processor according to claim 9, wherein said first picture format and said second picture format are a high definition format and a standard definition format, respectively.

13. A digital watermark detecting-processing method for executing digital-watermark-pattern detecting processing on data, said digital watermark detecting-processing method comprising:
  a digital-watermark-pattern generating step for generating a digital watermark pattern corresponding to a first picture format set beforehand;
  a digital-watermark-pattern correcting step for generating a corrected digital watermark pattern based on the generated digital watermark pattern, the corrected digital watermark pattern corresponding to a second picture format different from said first picture format; and
  a detection step for executing a digital watermark detecting process based on the corrected digital watermark pattern wherein said data is divided into smaller areas in which an overlapping portion is provided between adjacent smaller areas, and in said digital-watermark-pattern correcting step, said smaller areas are used as areas to be digitally watermarked by embedding digital watermarks.

14. The digital watermark detecting-processing method according to claim 13, wherein said digital-watermark-pattern correcting step includes:
 a lowest-common-multiple-picture digital-watermark-pattern generating step for calculating a least-common-multiple picture size of said first picture format and said second picture format and for generating for the calculated least-common-multiple picture size a lowest-common-multiple-picture digital watermark pattern corresponding to the digital watermark pattern generated in said digital-watermark-pattern generating step; and
 a second-picture-format digital-watermark-pattern generating step for executing based on the generated lowest-common-multiple-picture digital watermark pattern a process of generating a digital watermark pattern corresponding to said second picture format.

15. The digital watermark detecting-processing method according to claim 13, wherein said digital-watermark-pattern correcting step includes the step of generating a corrected digital watermark pattern in which a sum of values set for pixels of the digital watermark pattern is zero.

16. The digital watermark detecting-processing method according to claim 13, wherein said first picture format and said second picture format are a high definition format and a standard definition format, respectively.

17. A program storage medium for providing a computer program controlling a computer system to execute digital-watermark-pattern embedding processing on data, said computer program comprising:
 a digital-watermark-pattern generating step for generating a digital watermark pattern corresponding to a first picture format set beforehand;
 a digital-watermark-pattern correcting step for executing a process of generating a corrected digital watermark pattern based on the generated digital watermark pattern, the corrected digital watermark pattern corresponding to a second picture format different from said first picture format; and
 a digital-watermark-pattern embedding step for executing a process of embedding the corrected digital watermark pattern in the data wherein said data is divided into smaller areas in which an overlapping portion is provided between adjacent smaller areas, and in said digital-watermark-pattern correcting step, said smaller areas are used as areas to be digitally watermarked.

18. A program storage medium for providing a computer program controlling a computer system to execute digital-watermark-pattern detecting processing on data, said computer program comprising:
 a digital-watermark-pattern generating step for generating a digital watermark pattern corresponding to a first picture format set beforehand;
 a digital-watermark-pattern correcting step for executing a process of generating a corrected digital watermark pattern based on the generated digital watermark pattern, the corrected digital watermark pattern corresponding to a second picture format different from said first picture format; and
 a detection step for executing a digital watermark detecting process based on the corrected digital watermark pattern wherein said data is divided into smaller areas in which an overlapping portion is provided between adjacent smaller areas, and in said digital-watermark-pattern correcting step, said smaller areas are used as areas to be digitally watermarked.

\* \* \* \* \*